United States Patent
Yang et al.

(10) Patent No.: US 10,483,067 B2
(45) Date of Patent: Nov. 19, 2019

(54) OVERLOAD PROTECTION DEVICE FOR COMPRESSOR MOTOR

(71) Applicant: MICRO CONTACT SOLUTION CO., LTD., Cheonan-si, Chungcheongnam-do (KR)

(72) Inventors: Seung Eun Yang, Cheongju-si (KR); Jang Hyun Baic, Yongin-si (KR); Takashi Masuda, Shizuoka (JP)

(73) Assignee: MICRO CONTACT SOLUTION CO., LTD. (KR)

( * ) Notice: Subject to any disclaimer, the term of this patent is extended or adjusted under 35 U.S.C. 154(b) by 73 days.

(21) Appl. No.: 15/744,606

(22) PCT Filed: Jul. 14, 2016

(86) PCT No.: PCT/KR2016/007686
§ 371 (c)(1),
(2) Date: Jan. 12, 2018

(87) PCT Pub. No.: WO2017/010830
PCT Pub. Date: Jan. 19, 2017

(65) Prior Publication Data
US 2018/0218866 A1 Aug. 2, 2018

(30) Foreign Application Priority Data

Jul. 14, 2015 (KR) .................. 10-2015-0099985
Oct. 5, 2015 (KR) .................. 10-2015-0139986

(51) Int. Cl.
*H01H 71/16* (2006.01)
*F25D 29/00* (2006.01)
(Continued)

(52) U.S. Cl.
CPC ............. *H01H 71/16* (2013.01); *F25D 29/00* (2013.01); *H01H 37/521* (2013.01);
(Continued)

(58) Field of Classification Search
CPC ........ H01H 71/16; H01H 71/02; H01H 71/08; H01H 2071/167; H01H 37/521;
(Continued)

(56) References Cited

U.S. PATENT DOCUMENTS 5,574,421 A * 11/1996 Hickling .............. H01H 11/00
29/622
5,607,610 A * 3/1997 Furukawa ............ H01H 1/504
219/488

(Continued)

FOREIGN PATENT DOCUMENTS

JP 2011058467 3/2011
JP 2014159754 9/2014

(Continued)

OTHER PUBLICATIONS

International Search Report, International Application No. PCT/KR2016/007686, dated Oct. 17, 2016.

*Primary Examiner* — Jacob R Crum
(74) *Attorney, Agent, or Firm* — Perman & Green, LLP

(57) ABSTRACT

An overload protection device for a compressor motor and, more specifically, to an overload protection device for a compressor motor, which has an overload protection means and can thus more effectively prevent overload of the compressor motor.

18 Claims, 23 Drawing Sheets

(51) Int. Cl.
*H02K 11/27*   (2016.01)
*H01H 71/02*   (2006.01)
*H01H 71/08*   (2006.01)
*H01H 85/02*   (2006.01)
*H01H 85/04*   (2006.01)
*H01H 85/20*   (2006.01)
*H01H 37/52*   (2006.01)
*H01H 37/54*   (2006.01)

(52) U.S. Cl.
CPC ............ *H01H 71/02* (2013.01); *H01H 71/08* (2013.01); *H01H 85/0241* (2013.01); *H01H 85/04* (2013.01); *H01H 85/20* (2013.01); *H02K 11/27* (2016.01); *H01H 2037/549* (2013.01); *H01H 2085/0258* (2013.01)

(58) Field of Classification Search
CPC ......... H01H 2037/549; H01H 85/0241; H01H 85/04; H01H 85/20; H01H 2085/0258; H02K 11/27; F25D 29/00

USPC .......................................................... 337/85
See application file for complete search history.

(56)         References Cited

U.S. PATENT DOCUMENTS

| 6,414,285 | B1* | 7/2002 | Takeda | H01H 37/54 |
| | | | | 219/491 |
| 2002/0060898 | A1* | 5/2002 | Nagai | H01H 37/54 |
| | | | | 361/634 |
| 2011/0220475 | A1* | 9/2011 | Ullermann | H01H 71/16 |
| | | | | 200/290 |

FOREIGN PATENT DOCUMENTS

| KR | 20010059276 | 7/2001 |
| KR | 20060054743 | 5/2006 |
| KR | 0673294 | 1/2007 |
| KR | 20080107496 | 12/2008 |

\* cited by examiner

OVERLOAD PROTECTION DEVICE FOR COMPRESSOR MOTOR

CROSS REFERENCE TO RELATED APPLICATIONS

This application is the National State of International Application No. PCT/KR2016/007686, having an International Filing Date of 14 Jul. 2016, which designated the United States of America, and which International Application was published under PCT Article 21(2) as WO Publication No. 2017/010830 A1, and which claims priority from and the benefit of Korean Patent Application No. 10-2015-0099985, filed on 14 Jul. 2015, and Korean Patent Application No. 10-2015-0139986, fled on 5 Oct. 2015, the disclosures of which are incorporated herein by reference in their entireties.

BACKGROUND

1. Field

The presently disclosed embodiment relates to an overload protection device for a compressor motor and, more specifically, to an overload protection device having an overload protection means and configured to more effectively prevent a compressor motor from being overload.

2. Brief Description of Related Developments

Conventional motor protection devices used for compressors of refrigerators, freezers, or the like have a resistance heating element, and if a load current flowing into a compressor motor generates heat in the resistance heating element to cause a bimetal to reach a preset temperature, the bimetal deforms and breaks electrical connection.

Such a bimetal operates and interrupts the flow of current at a certain operating temperature. In addition, the bimetal returns at a certain return temperature, and thus the flow of current resumes. However, the return temperature may not be kept constant due to structural problems.

In general, a single bimetal is used to interrupt the flow of current at a certain operating temperature. However, for the case in which the single bimetal (a first bimetal) has a problem and does not operate, another bimetal (a second bimetal) is provided on an upper surface of the first bimetal as an auxiliary safety device.

It is designed that the operating temperature of the second bimetal is higher than the operating temperature of the first bimetal.

Conventionally, the second bimetal has the same structure as the first bimetal, and when the first bimetal operates (snaps), the second bimetal stays without snapping.

If the first bimetal does not operate due to error, the amount of current supplied to an overload protection device increases continuously, and as a result, a resistance heating element disposed in the overload protection device emits more heat, causing the second bimetal to operate at an operating temperature thereof.

A bimetal performs a snap action at a set temperature, but stays in an operation period called a creep-action period until reaching the set temperature. In the creep-action period, the bimetal does not snap, but the height of a concave portion of the bimetal reduces gradually.

Before performing a snap action, a first bimetal performs a creep action by which a second bimetal is pushed upward, and in this case, an edge of the second bimetal touches a movable arm located above the second bimetal.

In the related art, during the creep action of the first bimetal, the edge of the second bimetal touches the movable arm. In this case, the second bimetal touching the movable arm causes contact instability, and thus a technique has been proposed to solve the problem by locating an embossed portion of the movable arm at a position offset from a center portion of the second bimetal.

If a bimetal performs a snap action, current to a resistance heating element disposed in a motor protection device is interrupted, and thus the resistance heating element does not emit heat. Then, the temperature of the bimetal decreases, and the bimetal snaps back to its original shape. When the bimetal snaps back, since an elastic movable arm pushes the bimetal (specifically, a second bimetal), the return temperature or time is changed.

In the conventional method, since the embossed portion of the movable arm is offset from the center portion of the second bimetal, the pushing force of the movable arm is not uniformly distributed across the bimetal, making the return temperature or time irregular.

Therefore, it is needed to develop an overload protection device capable of preventing contact instability occurring when an edge of a second bimetal touches a movable arm during a creep-action period of a first bimetal, and maintaining the return temperatures and times of the bimetals to be constant by positioning an embossed portion of the movable arm at the centers of the bimetals.

In addition, it is also needed to develop an overload protection device capable of providing protection against overcurrents as well as overheating.

In addition, resistance heating elements used in such overload protection devices may have various specifications to generate an appropriate amount of heat at an appropriate amount of current. However, members such as a casing or a base of an overload protection device may have to be replaced to install a resistance heating element having different specifications in the overload protection device, which may decrease overall productivity and increase product cost.

Therefore, there is also a need to develop an overload protection device flexibly used with various resistance heating elements.

SUMMARY

The presently disclosed embodiment relates to an overload protection device for a compressor motor, and more particularly, an object of the presently disclosed embodiment is to provide an overload protection device for a compressor motor which includes an overload protection means having first and second bimetals and configured to have a constant return temperature and time and prevent contacts from being affected by interference between the second bimetal and a movable arm during a creep-action period of the first bimetal.

Another object of the presently disclosed embodiment is to provide an overload protection device for a compressor motor which includes a fuse unit for interrupting an overcurrent.

Another object of the presently disclosed embodiment is to provide an overload protection device for a compressor motor which additionally includes a heater holder configured to accommodate a resistance heating element such that various resistance heating elements may be easily assembled and applied.

To achieve the above-described objects, an aspect of the presently disclosed embodiment provides an overload protection device for a compressor motor, the overload protection device including: a base formed of an insulative material and including an inner space; a conductive terminal including an input terminal, an output terminal, and an intermediate terminal; an overload protection means placed in the inner space of the base; and a cover configured to cover the base, wherein the input terminal and the output terminal are at least partially embedded in the base and at least partially exposed inside the inner space, and the intermediate terminal is placed between the input terminal and the output terminal, the intermediate terminal being at least partially embedded in the base and at least partially exposed inside the inner space, wherein the overload protection means includes: a resistance heating element capable of conducting electricity and having a predetermined electrical resistance value; a movable arm including a material having electrical conductivity and elastic resilience, the movable arm being placed above the resistance heating element and having a predetermined length, the movable arm extending in a length direction thereof; and a bimetal placed between the resistance heating element and the movable arm, the bimetal deforming in shape at a predetermined operating temperature and returning to an original shape thereof at a predetermined return temperature, wherein the resistance heating element is electrically connected to the output terminal at one end thereof and electrically connected to the intermediate terminal at the other end thereof, the resistance heating element generating heat when conducting electricity, wherein a lengthwise end of the movable arm forms a fixed contact that is fixed to and electrically connected to the intermediate terminal, and the other lengthwise end of the movable arm forms a movable contact configured to make contact with the input terminal and vary in position, such that the movable arm electrically connects the input terminal and the intermediate terminal, wherein electrical connection between the movable contact and the input terminal is broken and made in such a manner that when the bimetal deforms in shape at a temperature equal to or higher than the operating temperature, the movable contact is spaced apart from the input terminal, and when the bimetal returns to the original shape thereof at a temperature equal to or lower than the return temperature, the movable contact and the input terminal come into contact with each other.

Preferably, the bimetal includes a first bimetal and a second bimetal placed on the first bimetal, wherein the first bimetal is shaped like a disc curved downward in a concave dish shape and deforms and snaps at a first operating temperature in an upwardly protruding curved shape, wherein the second bimetal has a downwardly curved concave dish shape and deforms and snaps at a second operating temperature in an upwardly protruding curved shape, wherein the second operating temperature is higher than the first operating temperature.

Preferably, the second bimetal has a long axis with a relatively long width and a short axis with a width smaller than the long axis, wherein the short axis is coincident the length direction of the movable arm, and an outer edge of the second bimetal is spaced apart from the movable arm such that contact interference does not occur between the outer edge of the second bimetal and the movable arm.

Preferably, the second bimetal has a rectangular shape with the long axis and the short axis, and an end of the second bimetal in the long axis is rounded.

Preferably, the inner space includes: a first accommodation portion formed in a lower region and having an arc shape with a predetermined depth and diameter; and a second accommodation portion formed above the first accommodation portion, wherein the resistance heating element is accommodated in the first accommodation portion, and the first bimetal, the second bimetal, and the movable arm are accommodated in the second accommodation portion.

Preferably, a first barrier wall and a second barrier wall are arranged in the second accommodation portion of the base, the first and second barrier walls protruding upward, extending lengthwise, spaced part from each other in a width direction thereof by a first distance, and being parallel with each other, wherein in a state in which the resistance heating element is accommodated in the first accommodation portion and the first and second bimetals are accommodated in the second accommodation portion, the movable arm is accommodated between the first and second barrier walls.

Preferably, the first barrier wall includes a first first barrier wall and a first second barrier wall that are respectively placed on both sides of the first accommodation portion and are spaced apart from each other with the first accommodation portion being therebetween, wherein the second barrier wall includes a second first barrier wall and a second second barrier wall that are respectively placed on both sides of the first accommodation portion and are spaced apart from each other with the first accommodation portion being therebetween, wherein the first and second bimetals are placed in a space between the first first barrier wall and the first second barrier wall and between the second first barrier wall and the second second barrier wall.

Preferably, the first distance corresponds to a width of the movable arm, and a distance between the first first barrier wall and the first second barrier wall and a distance between the second first barrier wall and the second second barrier wall correspond to a length of a short axis of the second bimetal.

Preferably, the movable arm includes an embossed portion at a center portion in the length direction of the movable arm, the embossed portion being rounded and protruding downward, wherein when the first bimetal or the second bimetal snaps, the embossed portion is pushed, and electrical connection between the input terminal and the output terminal through the movable arm is broken.

Preferably, a center of the embossed portion, a center of the first bimetal, and a center of the second bimetal are superposed to form a single axis in a vertical direction.

Preferably, the resistance heating element includes a heating coil wound to have a predetermined length and curved with a curvature, and the movable arm is placed above the heating coil and crossing the heating coil in a diameter direction of the heating coil.

Preferably, the overload protection device further includes a fuse unit placed in the base, wherein the fuse unit is electrically connected in series to the conductive terminal and includes a fuse line configured to be cut when a current equal to a higher than a predetermined value flows through the fuse line.

Preferably, the input terminal includes a first input terminal and the second input terminal spaced apart from the first input terminal, wherein the fuse unit includes a first fuse terminal and a second fuse terminal, and the fuse line connects the first fuse terminal and the second fuse terminal, wherein the first fuse terminal is electrically connected to the first input terminal, and the second fuse terminal is electrically connected to the second input terminal.

Preferably, the base includes: a first exposure recess in which at least a portion of the first input terminal is exposed upward; a second exposure recess in which at least a portion of the second input terminal is exposed upward; and a channel formed between the second exposure recess and the second exposure recess to connect the first exposure recess and the second exposure recess to each other, wherein the first fuse terminal is accommodated in the first exposure recess and placed on and connected to the first input terminal, wherein the second fuse terminal is accommodated in the second exposure recess and placed on and connected to the second input terminal, wherein the fuse line is arranged in the channel and connects the first fuse terminal and the second fuse terminal.

Preferably, the first input terminal includes a first internally exposed surface exposed upwardly, and the second input terminal has a second internally exposed surface exposed upwardly, wherein the first fuse terminal is placed on the first internally exposed surface and electrically connected to the first input terminal, and the second fuse terminal is placed on the second internally exposed surface and electrically connected to the second input terminal.

Preferably, the overload protection device further includes a heater holder including an accommodation space to accommodate the resistance heating element, wherein the base includes an installation space formed in the inner space to install the heater holder, and an outer shape of the heater holder corresponds to an outer shape of the installation space such that the heater holder is accommodated in the installation space.

Preferably, the resistance heating element includes a heating coil wound to have a predetermined length and curved in an arc shape having a curvature, wherein the movable arm is placed above the heating coil and crossing the heating coil in a diameter direction of the heating coil, wherein the heater holder includes the accommodation space shaped to accommodate the heating coil.

Preferably, the heater holder has a tetragonal outer shape, and a first curved surface curved outward is formed on at least a side of the heater holder, wherein the installation space of the base has a tetragonal outer shape, and a second curved surface corresponding to a shape of the first curved surface is formed on an inner circumferential surface of the installation space.

Preferably, the heater holder includes: a side wall having a tetragonal outer shape and formed along a peripheral outer side of the accommodation space around the accommodation space: and upper extensions protruding upward from upper portions of four corners of the side wall and arranged around the accommodation space, wherein the bimetal is placed and supported on the side wall.

Preferably, the bimetal is shaped like a disc curved downward in a concave dish shape, wherein when the bimetal reaches the operating temperature, the bimetal deforms and snaps such that a curved direction of the bimetal is inverted from downward to upward to deform the movable arm, and when the bimetal reaches the return temperature, the bimetal returns to a downwardly curved shape.

According to the overload protection device for a compressor motor of the presently disclosed embodiment, if a predetermined amount of power is applied to the overload protection device and the overload protection device reaches a predetermined operating temperature, the bimetal deforms to interrupt electrical connection, and thus the compressor motor may be easily simply prevented from being overloaded.

In addition, when the first bimetal deforms in an upwardly convex shape at the first operating temperature, interference does not occur between a lateral portion of the second bimetal and the movable arm, but the second bimetal and the movable arm come into contact with each other only at the embossed portion such that the movable arm may apply a constant pressing force to the first and second bimetals. Therefore, the temperature at which the first bimetal returns to its original shape may be constant. That is, the first bimetal may have a constant return temperature. In particular, interference between the second bimetal and the movable arm may be prevented while the first bimetal performs a creep action.

In addition, according to an aspect of the disclosed embodiment, the center axis of the curvature of the embossed portion of the movable arm and the center axis of the curvature of the bimetal are coincident with each other in a vertical direction such that a pressing force applied by the movable arm to the bimetal and a force applied from the bimetal to the movable arm may be constant.

In addition, owing to the fuse unit configured to be cut if an overcurrent is applied thereto, protection against an overcurrent as well as overheating may be provided.

In addition, according to the presently disclosed embodiment, the resistance heating element may not be directly mounted in the base but may be mounted in the base after being mounted in the additional heater holder, thereby improving productivity and reducing production cost. In addition, various heating elements may be applied to the base, and the heater holder may be formed of various materials according to heating conditions, thereby improving productivity and production cost. In addition, the heater holder formed of a material having a high heat distortion temperature may be provided separately from the base. In this case, machining may be easily performed, and protection against much higher temperatures may be provided.

In addition, according to the presently disclosed embodiment, conductive members for conducting electricity are sealed and isolated by embedding the conductive members in the base formed of an insulative material, and thus the phenomenon in which radiant heat is generated by arcs reflected from a conductor during switching of the fixed contact and the movable contact may be prevented.

Further, according to the presently disclosed embodiment, the inside of the base is entirely hermetically sealed with an insulator, and connection portions between terminals are sealed and isolated. Therefore, internal explosion does not cause external explosion, and permeation of external combustible gases is prevented, thereby guaranteeing safety.

In addition, according to the presently disclosed embodiment, since conductive members of the overload protection device are integrally formed in the base which is an insulator, the conductive members may be securely fixed. That is, even though the base deforms when the overload protection device is electrically, physically, or thermally impacted, the conductive members may be stably fixed, thereby reducing device failures.

In addition, according to the presently disclosed embodiment, an assembling process for inserting conductive members into the base may be omitted, and thus overload protection devices may be automatically manufactured with fewer deviations. Thus, products having uniform characteristics may be manufactured.

In addition, according to the presently disclosed embodiment, concave-convex portions are formed on the base and the cover, and the base is covered with and coupled with the cover. Therefore, the base and the cover may be securely coupled to each other, and the inside of the base may be securely sealed, thereby preventing permeation of external substances such as water, gases, or dust and reducing failures.

In addition, since the presently disclosed embodiment provides a structure in which conductive members are formed integrally with the base instead of a structure in which conductive members are inserted into the base, thereby preventing electrical connection failures caused by pieces separated from the base and entering between the fixed contact and the movable contact when conductive members are inserted into the base.

Furthermore, according to the presently disclosed embodiment, since conductive members are embedded in the base, heat generated from a conductive member used as a heating element may be minimally transferred by radiation and conduction, thereby reducing thermal deformation of the overload protection device and ensuring accurate operations of the overload protection device.

DETAILED DESCRIPTION

Figure 1:
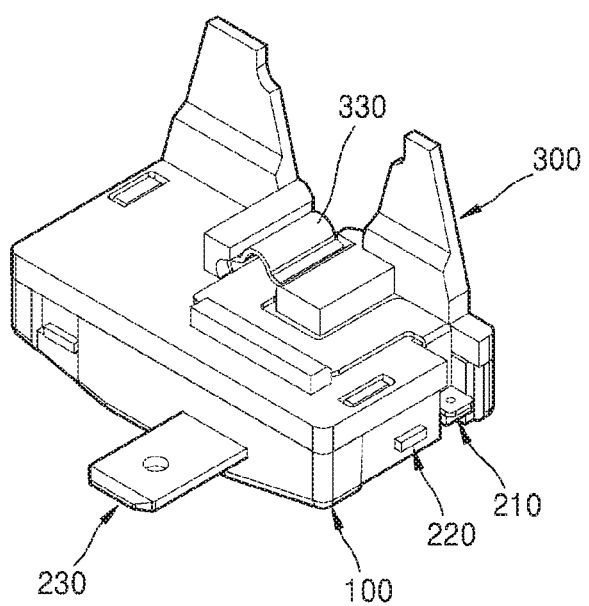
FIG. 1 is a view illustrating an overload protection device for a compressor motor according to an aspect of the presently disclosed embodiment.

To achieve the above-described objects, an aspect of the presently disclosed embodiment provides an overload protection device for a compressor motor, the overload protection device including: a base formed of an insulative material and including an inner space; a conductive terminal including an input terminal, an output terminal, and an intermediate terminal; an overload protection means placed in the inner space of the base between the input terminal and the output terminal to electrically connect the input terminal and the output terminal to each other and electrically disconnect the input terminal and the output terminal from each other; and a cover configured to cover the base, wherein the input terminal and the output terminal are at least partially embedded in the base and at least partially exposed inside the inner space, and the intermediate terminal is placed between the input terminal and the output terminal, the intermediate terminal being at least partially embedded in the base and at least partially exposed inside the inner space, wherein the overload protection means includes: a resistance heating element capable of conducting electricity and having a predetermined electrical resistance value; a movable arm including a material having electrical conductivity and elastic resilience, the movable arm being placed above the resistance heating element and having a predetermined length, the movable arm extending in a length direction thereof; and a bimetal placed between the resistance heating element and the movable arm, the bimetal deforming in shape at a predetermined operating temperature and returning to an original shape thereof at a predetermined return temperature, wherein the resistance heating element is electrically connected to the output terminal at one end thereof and electrically connected to the intermediate terminal at the other end thereof, the resistance heating element generating heat when conducting electricity, wherein a lengthwise end of the movable arm forms a fixed contact that is fixed to and electrically connected to the intermediate terminal, and the other lengthwise end of the movable arm forms a movable contact configured to make contact with the input terminal and vary in position, such that the movable arm electrically connects the input terminal and the output terminal, wherein electrical connection between the movable contact and the input terminal is broken and made in such a manner that when the bimetal deforms in shape at a temperature equal to or higher than the operating temperature, the movable contact is spaced apart from the input terminal, and when the bimetal returns to the original shape thereof at a temperature equal to or lower than the return temperature, the movable contact and the input terminal come into contact with each other.

Hereinafter, preferred aspects of the presently disclosed embodiment will be described with reference to the accompanying drawings. The aspects are not for purposes of limitation.

Figure 2:
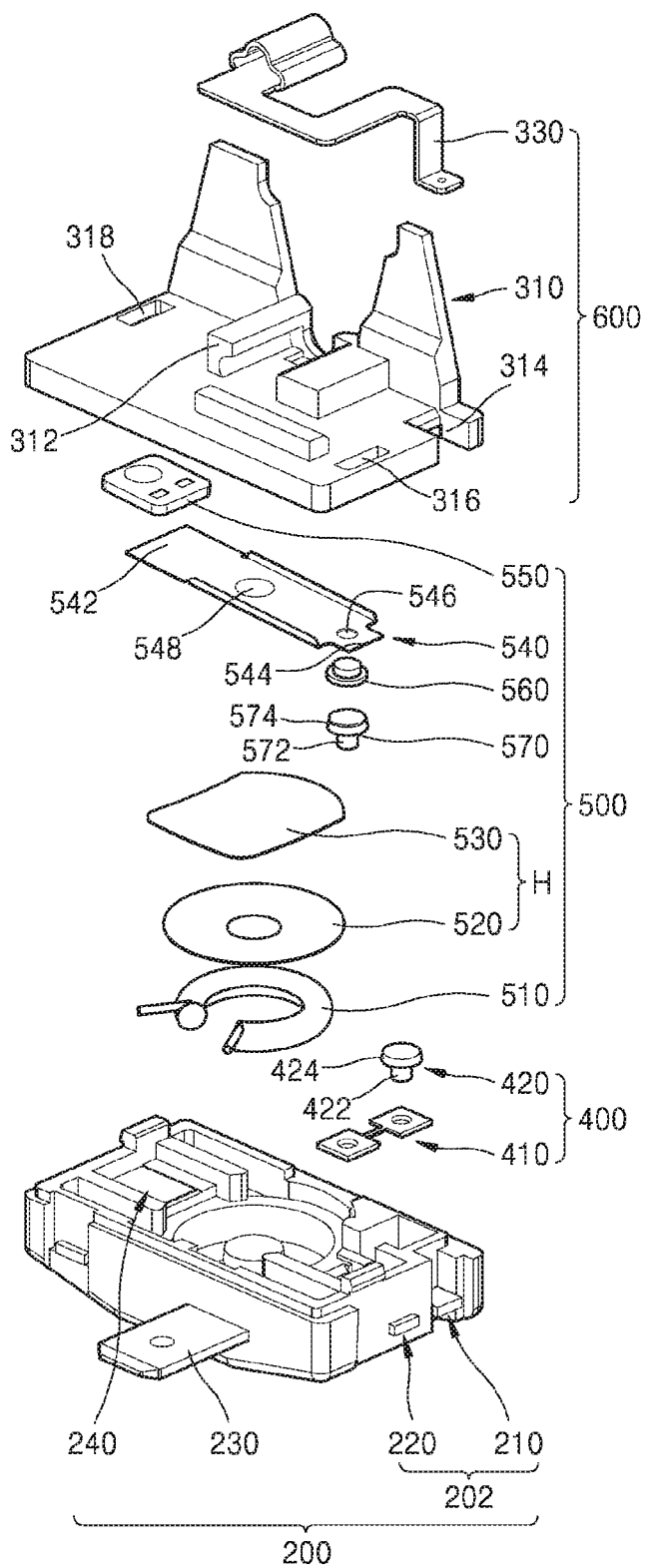
FIG. 2 is a view illustrating a structure of the overload protection device for a compressor motor according to an aspect of the presently disclosed embodiment.

FIG. 1 is a view illustrating an overload protection device 1 for a compressor motor according to an aspect of the presently disclosed embodiment, and FIG. 2 is a view illustrating the structure of the overload protection device 1 for a compressor motor according to the aspect of the presently disclosed embodiment.

Hereinafter, preferred aspects of the presently disclosed embodiment will be described with reference to the accompanying drawings. The aspects are not for purposes of limitation.

According to the presently disclosed embodiment, the overload protection device 1 for a compressor motor includes a base 100, a conductive terminal 200, a cover 300, a fuse unit 400, and an overload protection means 500.

Firstly, the base 100, the conductive terminal 200 embedded in the base 100, and the fuse unit 400 will be described with reference to FIGS. 3 to 7.

Figure 3:
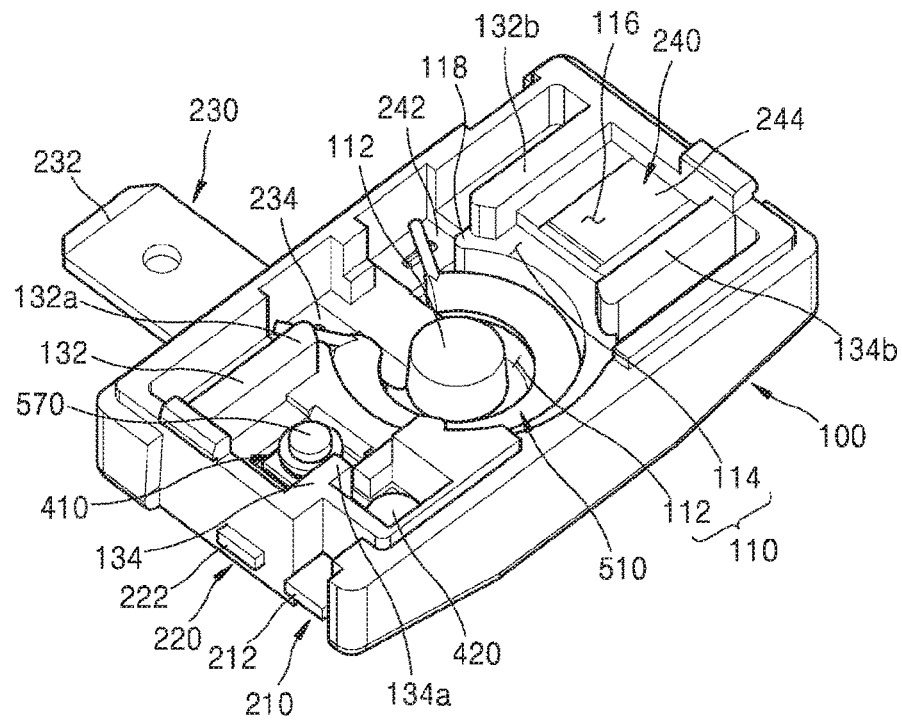
FIGS. 3 to 7 are views illustrating a base and a conductive terminal coupled to the base in the overload protection device for a compressor motor according to an aspect of the presently disclosed embodiment.
Figure 4:
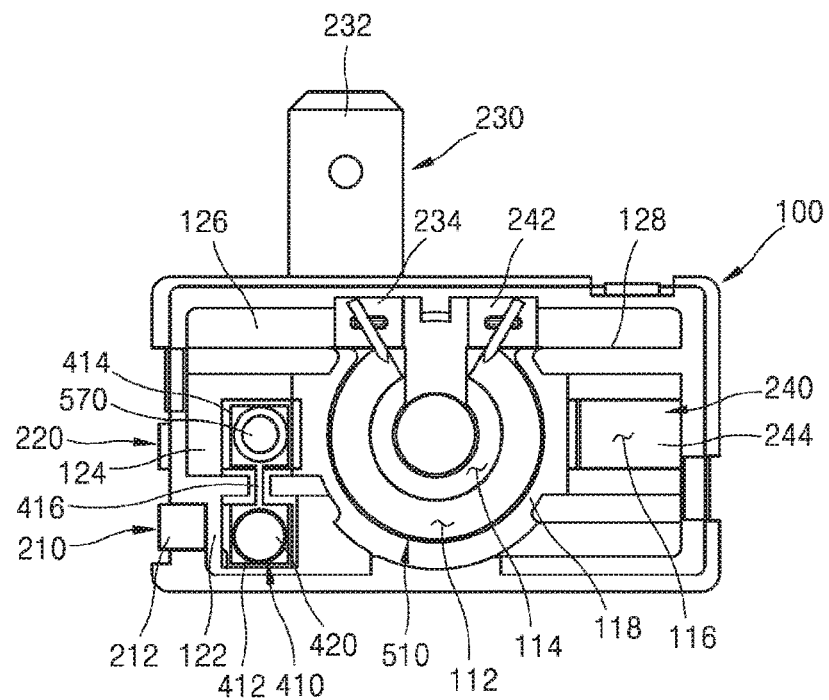
Figure 5:
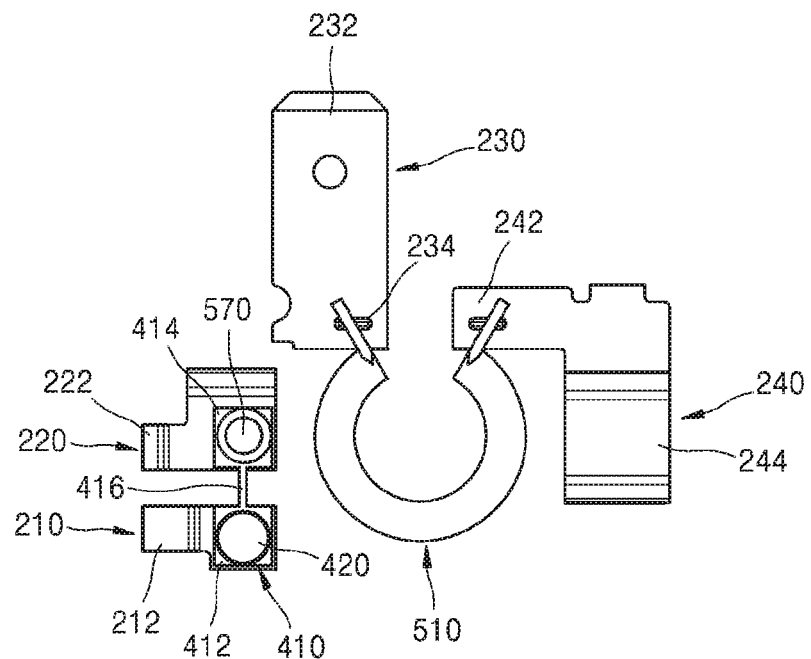
Figure 6:
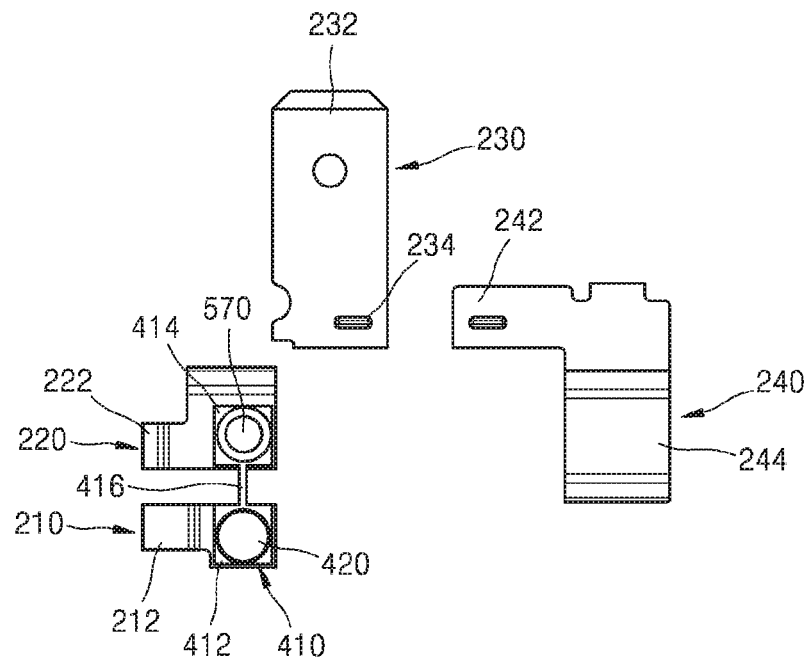
Figure 7:
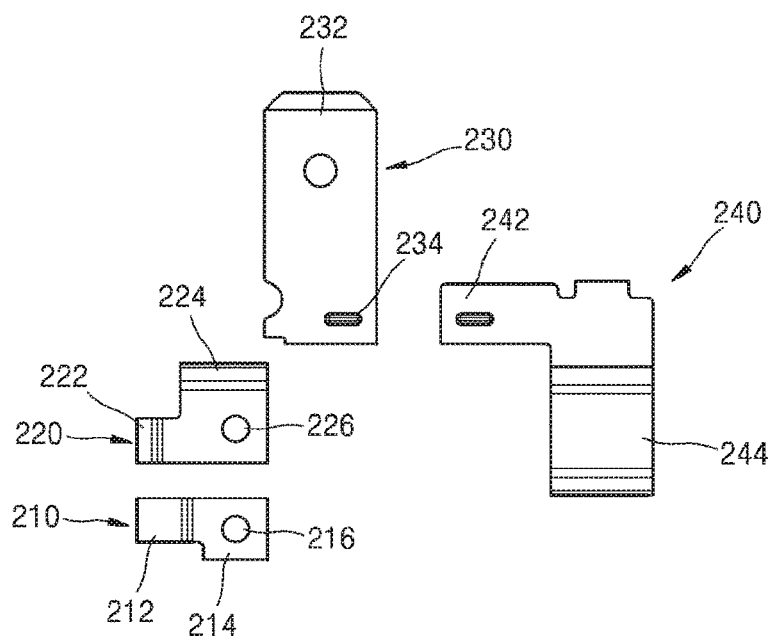

Here, FIGS. 3 and 4 are views in which the cover 300 illustrated in FIG. 1 is omitted, FIG. 5 is a view in which the base 100 illustrated in FIG. 4 is omitted, FIG. 6 is a view in which a resistance heating element 510 illustrated in FIG. 5 is omitted, and FIG. 7 is view in which the fuse unit 400 illustrated in FIG. 6 is omitted.

As a whole, the base 100 may be formed, by molding, of a material such as a plastic material having high insulation and heat shielding characteristics. In addition, the base 100 includes an inner space 110 accommodating the overload protection means 500 which is substantially a main part of the overload protection device 1 of the presently disclosed embodiment.

The inner space 110 includes a lower first accommodation portion 112 and an upper second accommodation portion 114. The first accommodation portion 112 has an arc shape having a predetermined depth and diameter and accommodates the resistance heating element 510 (described later). In addition, the upper second accommodation portion 114 extends further than the first accommodation portion 112 and has a larger area than the first accommodation portion 112, and a first bimetal 520, a second bimetal 530, and a movable arm 540 are arranged in the second accommodation portion 114. That is, the inner space 110 may include: the first accommodation portion 112 having an arc shape with a predetermined depth; and the second accommodation portion 114 formed above the first accommodation portion 112 and having a larger area than the first accommodation portion 112.

In the second accommodation portion 114, a first barrier wall 132 and a second barrier wall 134 may be provided. The first and second barrier walls 132 and 134 protrude upward and extend lengthwise, and are spaced apart from each other by a first distance in a width direction and arranged parallel to each other. That is, the first barrier wall 132 and the second barrier wall 134 protrude from a bottom surface of the second accommodation portion 114. Therefore, a rectangular movable arm accommodating space 116 is provided between the first barrier wall 132 and the second barrier wall 134 to accommodate the movable arm 540 (described later). Therefore, the movable arm 540 may be placed in position.

In addition, lengthwise middle portions of the first barrier wall 132 and the second barrier wall 134 are removed to form gaps. In more detail, as shown in FIGS. 3 and 4, the first barrier wall 132 includes a first first barrier wall 132a and a first second barrier wall 132b, and the second barrier wall 134 includes a second first barrier wall 134a and a second second barrier wall 134b.

The barrier walls are arranged based on the first accommodation portion 112, that is, the first first barrier wall 132a, the first second barrier wall 132b, the second first barrier wall 134a, and the second second barrier wall 134b are arranged all around the first accommodation portion 112. Thus, if end portions of the first first barrier wall 132a, the first second barrier wall 132b, the second first barrier wall 134a, and the second second barrier wall 134b are connected, a tetragonal space is formed. In addition, each of the first first barrier wall 132a, the first second barrier wall 132b, the second first barrier wall 134a, and the second second barrier wall 134b is placed at a predetermined distance from an outer side of the first accommodation portion 112 such that a support space 118 may be formed along a peripheral outer side of the first accommodation portion 112 to accommodate and support a bimetal H (described later).

In addition, the size of the gap between the first first barrier wall 132a and the first second barrier wall 132b may be equal to the size of the gap between the second first barrier wall 134a and the second second barrier wall 134b. The first bimetal 520 and the second bimetal 530 (described later) are accommodated in the gaps, and particularly the second bimetal 530 is placed between the first first barrier wall 132a and the first second barrier wall 132b and between the second first barrier wall 134a and the second second barrier wall 134b such that the second bimetal 530 may be fixed without wobbling.

The conductive terminal 200 is a conductive electrical terminal including an input terminal 202, an output terminal 230, and an intermediate terminal 240 that are embedded in the base 100. Here, the input terminal 202 includes a first input terminal 210 and a second input terminal 220.

The first input terminal 210, the second input terminal 220, and the output terminal 230 are at least partially embedded in the base 100, at least partially exposed to the outside of the base 100, and at least partially exposed in the inner space 110.

The intermediate terminal 240 may be provided between the input terminal 202 and the output terminal 230 to mediate connection therebetween. The intermediate terminal 240 is placed between the input terminal 202 and the output terminal 230 in a state in which the intermediate terminal 240 is at least partially embedded in the base 100 and at least partially exposed in the inner space 110.

The first input terminal 210 includes a first internally exposed surface 214 exposed inside the base 100 and a first externally exposed surface 212 configured to be connected to an external electric device, and a portion between the first internally exposed surface 214 and the first externally exposed surface 212 is surrounded by an insulative material of the base 100 to embed and seal the portion in the base 100. That is, a portion of the intermediate terminal 240 between the first externally exposed surface 212 and the first internally exposed surface 214 may be embedded and sealed by surrounding the portion with the insulative material of the base 100. The first input terminal 210 may be electrically connected to an external electric device through the first externally exposed surface 212.

The second input terminal 220 includes a second internally exposed surface 224 exposed in the base 100 and a second externally exposed surface 222 configured to be connected to an external electric device, and a portion between the second internally exposed surface 224 and the second externally exposed surface 222 is surrounded by the insulative material of the base 100 to embed and seal the portion in the base 100. That is, a portion of the second input terminal 220 between the second externally exposed surface 222 and the second internally exposed surface 224 may be embedded and sealed by surrounding the portion with the insulative material of the base 100.

The first input terminal 210 and the second input terminal 220 are separate members spaced apart from each other. The first input terminal 210 and the second input terminal 220 are electrically connected to each other via the fuse unit 400 (described later), and if the fuse unit 400 is electrically cut by an overload current, the first input terminal 210 and the second input terminal 220 may be electrically disconnected from each other. This will be described later.

In order to embed the first input terminal 210 and the second input terminal 220 as described above, the base 100 may include a first cover region 122 and a second cover region 124 that cover the first input terminal 210 and the second input terminal 220. The base 100 may be formed by injecting and hardening a predetermined material in a mold in which the first input terminal 210 and the second input terminal 220 are arranged. In addition, a fixed contact terminal 570 may be provided on the second internally exposed surface 224 of the second input terminal 220 so as to facilitate electrical contact with the movable arm 540 (described later).

The output terminal 230 includes a third internally exposed surface 234 exposed in the inner space of the base 100 and a third externally exposed surface 232 configured to be connected to an external electric device, and a portion between the third internally exposed surface 234 and the third externally exposed surface 232 is surrounded by the insulative material of the base 100 to embed and seal the portion in the base 100. That is, a portion of the output terminal 230 between the third externally exposed surface 232 and the third internally exposed surface 234 may be embedded and sealed by surrounding the portion with the insulative material of the base 100. To this end, the base 100 may include a third cover region 126 covering the output terminal 230, and may be formed by injecting and hardening a predetermined material in a mold in which the output terminal 230 is placed.

In addition, the intermediate terminal 240 is located between the second input terminal 220 and the output terminal 230 at a position inside the base 100 in a state in which a portion of the intermediate terminal 240 is embedded in the base 100. The intermediate terminal 240 may include fourth internally exposed surfaces 242 and 244, and a portion of the intermediate terminal 240 between the fourth internally exposed surfaces 242 and 244 may be embedded and sealed by surrounding the portion with the insulative material of the base 100. To this end, the base 100 may further include a fourth cover region 128 covering the intermediate terminal 240.

The first and second input terminals 210 and 220, the output terminal 230, and the intermediate terminal 240 are provided as described above, that is, embedded in the base 100 except for the exposed surfaces. Thus, areas unnecessarily exposed may be reduced.

That is, if the first and second input terminals 210 and 220, the output terminal 230, and the intermediate terminal 240 are excessively exposed inside the base 100, heat generated from exposed portions may unintentionally thermally deform the first and second bimetals 520 and 530 (described later), and thus deformation may not occur exactly at an intended power level and an intended operating temperature. However, according to the presently disclosed embodiment, owing to the embedment and sealing in the base 100 except for predetermined exposed surfaces, the first and second bimetals 520 and 530 (described later) may not be unnecessarily exposed to heat, and thus overload protection may be provided at an exact power level and operating temperature.

Figure 8:
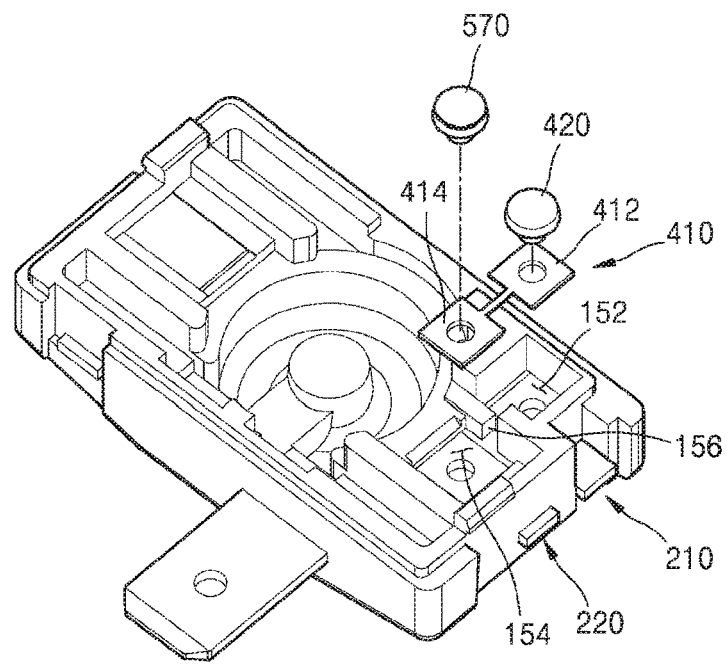
FIG. 8 is a view illustrating a structure of a fuse unit of the overload protection device for a compressor motor according to an aspect of the presently disclosed embodiment.

Hereinafter, the fuse unit 400 will be described with reference to FIG. 8.

The fuse unit 400 is a member connected in series with the input terminal 202, the output terminal 230, and the intermediate terminal 240. According to an example, as shown in the drawings, the fuse unit 400 is placed between the first input terminal 210 and the second input terminal 220 to connect the first input terminal 210 and the second input terminal 220. More specifically, the fuse unit 400 includes a fuse means 410, and a fuse connection portion 420. The fuse means 410 is placed in the base 100 and includes: a first fuse terminal 412 making contact with the first internally exposed surface 214 of the first input terminal 210, a second fuse terminal 414 making contact with the second internally exposed surface 224 of the second input terminal 220, and a fuse line 416 electrically connecting the first fuse terminal 412 and the second fuse terminal 414 and configured to be cut if a current higher than a predetermined value flows through the fuse line 416.

The fuse line 416 may have a predetermined thickness and may thus be cut if an overcurrent is applied thereto. Therefore, if an overcurrent greater than a predetermined value is applied to the fuse line 416, the fuse line 416 is cut, and thus the electrical connection between the first input terminal 210 and the second input terminal 220 is broken, thereby preventing the application of an overcurrent.

The fuse connection portion 420 may be provided to facilitate connection between the first internally exposed surface 214 and the first fuse terminal 412. A first hole 413 may be formed in the first fuse terminal 412, and a second hole 216 may be formed in the first internally exposed surface 214 of the first input terminal 210. The fuse connection portion 420 may include: an insertion portion 422 configured to be inserted through the first hole 413 and the second hole 216; and a head 424.

In addition, the fixed contact terminal 570 may be provided to facilitate connection between the second internally exposed surface 224 and the second fuse terminal 414 and contact with a movable contact (described later). A third hole 415 may be formed in the second fuse terminal 414, and a fourth hole 226 may be formed in the second internally exposed surface of the second input terminal 220. The fixed contact terminal 570 may include: an insertion portion 572 configured to be inserted through the third hole 415 and the fourth hole 226; and a head 574.

In addition, a recess and a channel may be formed in the base 100 to appropriately arrange the fuse unit 400 therein.

More specifically, the base 100 includes a first exposure recess 152 through which a portion of the first input terminal 210 is exposed, and a second exposure recess 154 through which a portion of the second input terminal 220 is exposed. The first exposure recess 152 allows the first internally exposed surface 214 to be exposed upward, and the second exposure recess 154 allows the second internally exposed surface 224 to be exposed upwardly.

The first fuse terminal 412 and the second fuse terminal 414 may be respectively placed on the first input terminal 210 and the second input terminal 220 exposed through the first exposure recess 152 and the second exposure recess 154. That is, the first fuse terminal 412 may be placed on and connected to the first internally exposed surface 214, and the second fuse terminal 414 may be placed on and connected to the second internally exposed surface 224.

A predetermined channel 156 is provided to connect the first exposure recess 152 and the second exposure recess 154, and the fuse line 416 maybe placed in the channel 156 to connect the first fuse terminal 412 and the second fuse terminal 414 through the channel 156. In this manner, a fuse having a simple structure may be provided in the overload protection device 1 for a compressor motor.

Hereinafter, the overload protection means 500 will be described.

The overload protection means 500 forms a main part of the overload protection device 1 for a compressor motor of the present disclosure. The overload protection means 500 is placed inside the base 100 to enable and disable electrical connection between the second input terminal 220 and the output terminal 230. In more detail, the overload protection means 500 enables and disables electrical connection between the intermediate terminal 240 and the second input terminal 220.

Specifically, the overload protection means 500 includes the resistance heating element 510; the movable arm 540; and the first and second bimetals 520 and 530.

The resistance heating element 510 is a member having electrical resistance. The resistance heating element 510 may include a coil wound to a predetermined length or may be configured to generate heat according to the electrical resistance thereof. That is, the resistance heating element 510 may be a coil-like member, or may be a heater member processed using a press. The type of the resistance heating element 510 is not limited.

Here, the resistance heating element 510 has a shape corresponding to the shape of the first accommodation portion 112 of the base 100 so as to be accommodated in the first accommodation portion 112. Therefore, as shown in the drawings, the resistance heating element 510 may preferably be a heating coil wound to have a predetermined length and having electrical resistance. The resistance heating element 510 may wound in such a manner that the resistance heating element 510 may extend in an arc shape having a predetermined curvature. Therefore, if electricity is supplied to the resistance heating element 510, the resistance heating element 510 may generate heat. Preferably, factors such as the wound structure, length, and type of the resistance heating element 510 are determined such that if a given amount of power is supplied, the resistance heating element 510 may generate heat until reaching a predetermined temperature.

An end of the resistance heating element 510 is electrically connected to the output terminal 230, and the other end is electrically connected to the intermediate terminal 240. That is, in a state in which the resistance heating element 510 is accommodated in the first accommodation portion 112, an end of the resistance heating element 510 is connected to the third internally exposed surface 234 of the output terminal 230, and the other end of the resistance heating element 510 is connected to the fourth internally exposed surface 242 of the intermediate terminal 240.

The movable arm 540 is configured to electrically connect the intermediate terminal 240 and the second input terminal 220 to each other. The movable arm 540 extends to a predetermined length. A lengthwise end of the movable arm 540 forms a fixed contact 542 which is fixed to and electrically connected to the intermediate terminal 240. The other lengthwise end of the movable arm 540 is a free end forming a movable contact 544 that is configured to be selectively brought into contact with the second input terminal 220 and separated from the second input terminal 220. Therefore, the movable arm 540 may function as a medium electrically connecting the input terminal 202 and the output terminal 230 to each other.

More specifically, the fixed contact 542 of the movable arm 540 is fixedly connected to the fourth internally exposed surface 244 of the intermediate terminal 240, and the movable contact 544 of the movable arm 540 is connected to the second internally exposed surface 224 of the second input terminal 220. In addition, a movable contact terminal 560 may be provided on the movable contact 544 so as to facilitate electrical contact with the second input terminal 220. The movable contact terminal 560 may be in contact with the fixed contact terminal 570 provided on the second internally exposed surface 224 of the second input terminal 220.

The movable arm 540 may be placed above the arc-shaped resistance heating element 510 while crossing the resistance heating element 510 in a diameter direction of the resistance heating element 510. Therefore, the fixed contact 542 and the movable contact 544 provided on both lengthwise ends of the movable arm 540 may be located at both lateral portions of the resistance heating element 510 in the diameter direction of the resistance heating element 510.

In this case, the movable arm 540 is formed of a material having elasticity as well as electrical conductivity such that the movable arm 540 may vary in shape and recover its original shape. For example, the movable arm 540 may be formed of a material such as copper. In addition, as a whole, the movable arm 540 may have a plate shape having a predetermined length and area for ease shape variations and recovery. More preferably, the movable arm 540 may have a rectangular shape having a predetermined length and width.

Figure 14:
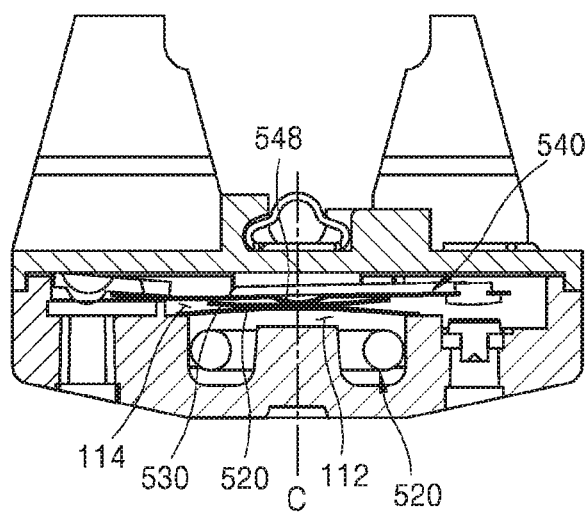
FIG. 14 is a cross-sectional view illustrating the overload protection device for a compressor motor according to an aspect of the presently disclosed embodiment.

In addition, an embossed portion 548 protruding downward from a lengthwise middle portion of the movable arm 540 may be provided for contact with the bimetal H (described later). The embossed portion 548 is shaped like a part of a hemispherical shape and is rounded in a downwardly protruding shape as shown in FIGS. 9 and 14.

In addition, a fixing iron piece 550 may be provided to fix the movable arm 540 to the base 100 and facilitate deformation and displacement of the movable arm 540 while improving electrical conductivity. The fixing iron piece 550 may be fixed to an upper surface of the fixed contact 542 of the movable arm 540 so as to securely electrically connect the intermediate terminal 240 and the movable arm 540 to each other.

The bimetal H is placed between the resistance heating element 510 and the movable arm 540 and is configured to vary in shape by heat. That is, since the bimetal H is placed adjacent to the resistance heating element 510, if the temperature of the bimetal H increases to a predetermined operating temperature or higher because of heat generated by the resistance heating element 510, the shape of the bimetal H may vary. In addition, if the temperature of the bimetal H decreases to a predetermined return temperature or lower, the bimetal H may return to its original shape. At this time, since the shape of the bimetal H varies at the predetermined operating temperature, it may be understood that the shape of the bimetal H is varied by applying a predetermined amount of power or current.

Figure 9:
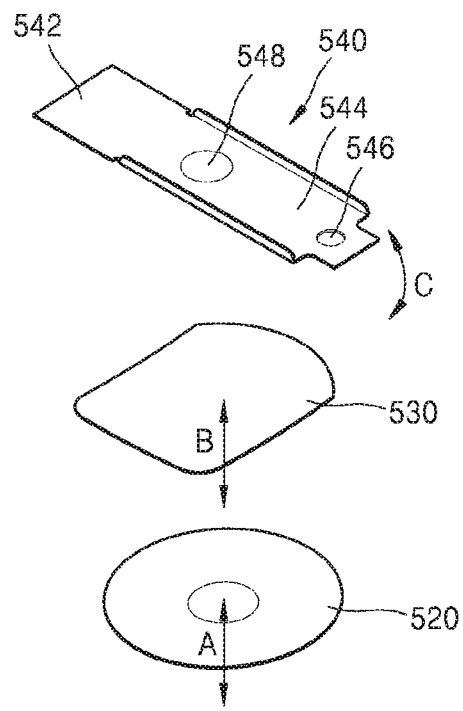
FIG. 9 is a view illustrating an operation between bimetals and a movable arm of the overload protection device for a compressor motor according to an aspect of the presently disclosed embodiment.
Figure 10:
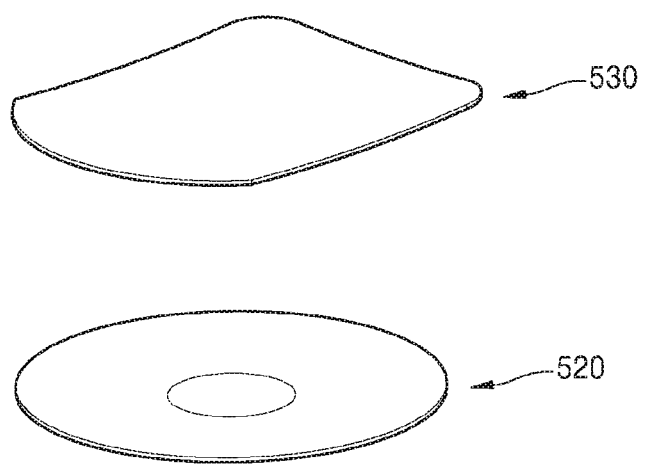
FIGS. 10 and 11 are detailed views illustrating a first bimetal and a second bimetal of the overload protection device for a compressor motor according to an aspect of the presently disclosed embodiment.
Figure 11:
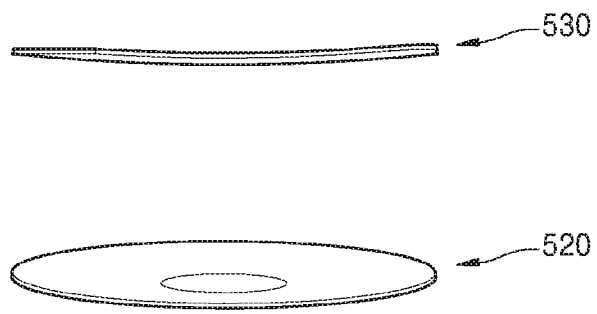

As shown in FIG. 9, the bimetal H includes the first bimetal 520 and the second bimetal 530. The first bimetal 520 may be deformed as indicated by A, and the second bimetal 530 may be deformed as indicated by B such that the movable arm 540 may be tilted as indicated by C.

The structures and shapes of the first and second bimetals 520 and 530 will now be described in more detail with reference to FIGS. 9 to 13.

The first bimetal 520 is shaped like a disc shape having a predetermined area, and is curved downward to have a concave dish shape. If the first bimetal 520 reaches a first operating temperature as the surrounding temperature increases, the concave direction of the first bimetal 520 is inverted, and then if the first bimetal 520 reaches a predetermined return temperature, the first bimetal 520 snaps back to its original shape.

That is, when the first bimetal 520 is in a normal state without thermal deformation, the first bimetal 520 has a dish-like shape recessed downward. Therefore, in a state in which the first bimetal 520 is placed in the second accommodation portion 114, a portion of the downwardly-recessed portion of the first bimetal 520 is placed in the first accommodation portion 112. In this case, as described above, since each of the first first barrier wall 132a, the first second barrier wall 132b, the second first barrier wall 134a, and the second second barrier wall 134b is placed at a predetermined distance from an outer side of the first accommodation portion 112, the first bimetal 520 may be placed in the support space 118 formed around the first accommodation portion 112.

If the first bimetal 520 reaches the first operating temperature, the first bimetal 520 deforms in such a manner that the curved direction of the first bimetal 520 is inverted from downward to upward, and thus the movable arm 540 is pushed and deformed. That is, if the first bimetal 520 is thermally deformed and the recessed direction of the first bimetal 520 is inverted, the first bimetal 520 comes to have an overturned dish shape protruding upward, and thus the first bimetal 520 protrudes upward from the bottom surface of the second accommodation portion 114, thereby pushing up the embossed portion 548 of the movable arm 540. In addition, if the surrounding temperature decreases to the predetermined return temperature, the first bimetal 520 may return to its original downwardly curved shape.

When the first bimetal 520 is not thermally deformed, the fixed contact terminal 570 and the movable contact terminal 560 are in contact with each other. If the first bimetal 520 thermally deforms and snaps, the first bimetal 520 pushes up the embossed portion 548 of the movable arm 540 such that the fixed contact terminal 570 and the movable contact terminal 560 may be separated from each other. In addition, if the first bimetal 520 is cooled to the predetermined return temperature, the first bimetal 520 returns to its original downwardly curved shape, and thus the fixed contact terminal 570 and the movable contact terminal 560 are brought into contact with each other and electrically connected to each other.

At this time, deformation of the first bimetal 520 is caused by heat generated by the resistance heating element 510 according to power applied to the resistance heating element 510. As a result, it could be said that if power is applied, and heat necessary to heat the first bimetal 520 to the first operating temperature is generated, electrical connection between the movable arm 540 and the input terminal 202 is broken. That is, it could be understood that if power exceeding a predetermined limit is applied, electrical connection of the overload protection device 1 for a compressor motor of the presently disclosed embodiment is broken to provide protection against an overloaded state.

In addition, as described above, the resistance heating element 510 may easily generate heat, and the heat may be easily transferred to the first bimetal 520 according to the arrangement structure and type of the resistance heating element 510 and the first bimetal 520. In addition, since the movable arm 540 is configured to be deformed lengthwise, electrical connection and disconnection may be easily achieved according to the deformation of the movable arm 540. In addition, since the resistance heating element 510 has an arc shape, space utilization may be maximized.

The second bimetal 530 is located above the first bimetal 520. Like the first bimetal 520, the second bimetal 530 is formed in a downwardly-cured dish shape, and the curved direction of the second bimetal 530 is inverted from downward to upward direction at a second operating temperature. Here, the second operating temperature is higher than the first operating temperature. In addition, the second bimetal 530 snaps back to its original shape at a predetermined return temperature. At this time, the return temperature of the second bimetal 530 may be much lower than the return temperature of the first bimetal 520.

Since the second bimetal 530 is provided, even though the first bimetal 520 does not operate at the first operating temperature due to an abnormal phenomenon, the second bimetal 530 operates at the second operating temperature to prevent an overloaded state. That is, if the first bimetal 520 does not operate at a temperature higher than the first operating temperature due to an abnormal phenomenon, the temperature of the second bimetal 530 may increase continuously. Then, if the second bimetal 530 reaches the second operating temperature, the second bimetal 530 deforms and pushes up the movable arm 540.

Figure 12:
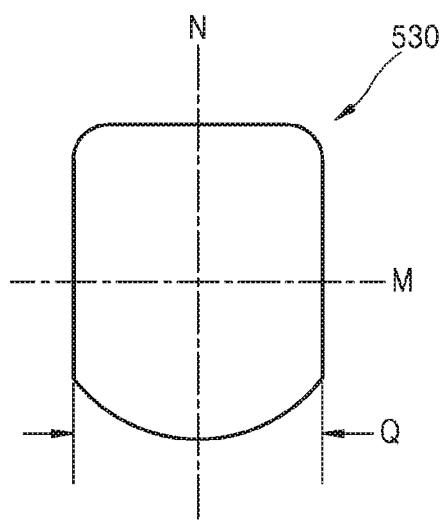
FIG. 12 is a detailed view illustrating the second bimetal of the overload protection device for a compressor motor according to an aspect of the presently disclosed embodiment.
Figure 13:
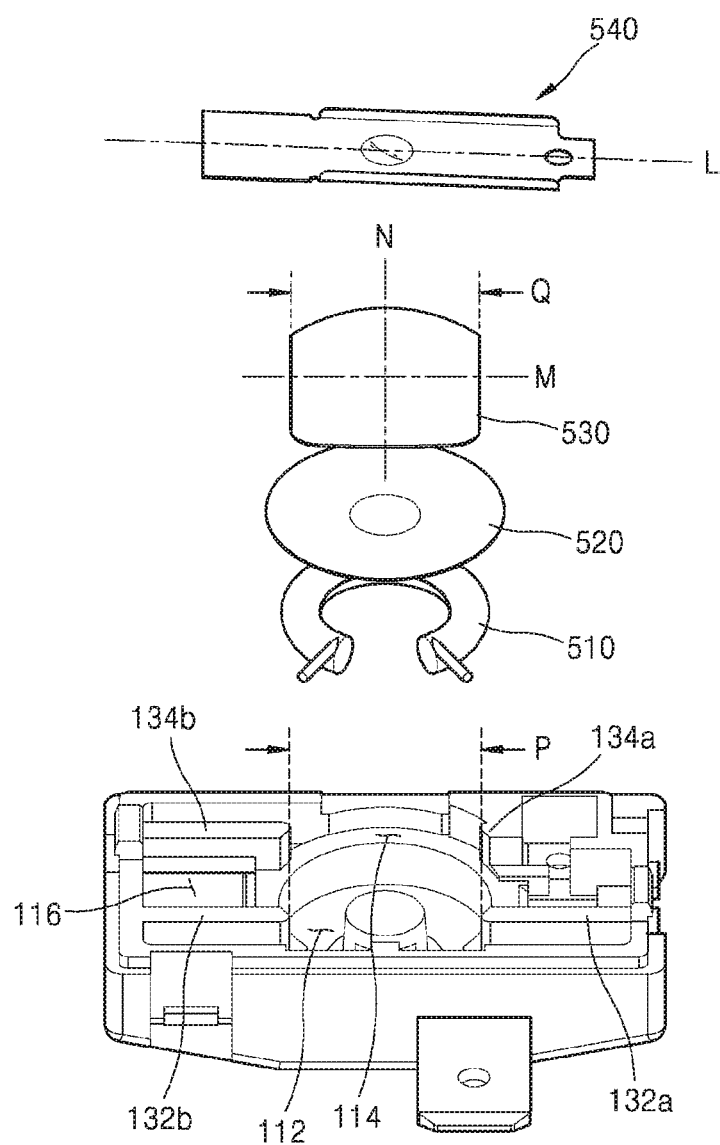
FIG. 13 is a view illustrating the first bimetal, the second bimetal, the movable arm, and a resistance heating element that are accommodated in the base of the overload protection device for a compressor motor according to an aspect of the presently disclosed embodiment.

In addition, as shown in FIGS. 12 and 13, unlike the first bimetal 520 having a circular shape, the second bimetal 530 may have a shape having a long axis N and a short axis M. More specifically, as shown in FIG. 12, the second bimetal 530 may have a rectangular shape having a long axis N and a short axis M, and preferably as shown in FIG. 12, the second bimetal 530 may have a tetragonal shape at an end in the long axis N direction and a circular round shape at the other end in the long axis N direction. In addition, the curvature of a rounded portion of the second bimetal 530 may be preferably the same as the curvature of a rounded portion of the first bimetal 520 such that a lower surface of the second bimetal 530 may be brought into tight contact with an upper surface of the first bimetal 520.

Here, the second bimetal 530 is disposed in the second accommodation portion 114 in such a manner that the tetragonal end in the long axis N direction is correspondingly placed in a tetragonal portion of the second accommodation portion 114, and the circular round end in the long axis N direction is correspondingly placed in a circular portion of the second accommodation portion 114. In this manner, the second bimetal 530 may be properly accommodated and fixed in position.

In addition, as shown in FIG. 13, both ends of the second bimetal 530 in the short axis M direction are brought into contact with the first and second barrier walls 132 and 134 and fixed in position. To this end, the length Q of the short axis M of the second bimetal 530 may correspond to the width P of the gap between the first first barrier wall 132*a* and the first second barrier wall 132*b* and the gap between the second first barrier wall 134*a* and the second second barrier wall 134*b*. Here, the expression "correspond to" is used to denote that the dimensions are relatively similar to each other such that the second bimetal 530 can be accommodated without being strongly shaken or shifted in position, and the expression "correspond to" is not limited to being equal to each other with no tolerance. Therefore, the second bimetal 530 may be fixed in position without being shaken or displaced. In addition, both ends of the second bimetal 530 in the long axis N direction may be fixed in position as being brought into contact with peripheral inner surfaces of the second accommodation portion 114.

At this time, the short axis M direction of the second bimetal 530 may coincide with a length direction L of the movable arm 540. Here, the expression "coincide with" is not limited to "being perfectly the same as" but includes "generally coincide with" with a small included angle therebetween. According to this, the long axis N may be orthogonal to the length direction L of the movable arm 540.

Therefore, even when the first bimetal 520 is deformed in an upwardly convex shape while undergoing a creep-action period and reaching the first operating temperature, contact instability occurring when the outer edge of the second bimetal 530 makes contact with the movable arm 540 may be prevented.

If it is assumed that the second bimetal 530 has the same circular shape as the first bimetal 520, the following situation may occur. Firstly, when the first bimetal 520 is deformed in an upwardly convex shape at the first operating temperature, the second bimetal 530 is pushed upward by the first bimetal 520. At this time, since the temperature of the second bimetal 530 is below the second operating temperature, the second bimetal 530 maintains its original shape, that is, a downwardly convex shape with the outer edge protruding upward. Therefore, the outer edge of the second bimetal 530 may make contact with the movable arm 540. In particular, as described in the description of the background art, the outer edge of the second bimetal 530 may touch the movable arm 540 during the creep-action period. In this case, since the outer edge of the second bimetal 530 comes into contact with a portion of the movable arm 540 other than the embossed portion 548 and applies a force to the movable arm 540, the movable arm 540 is pushed by a non-uniform pressure, thereby resulting in a non-uniform operating temperature, operating time, return temperature, and return time. Of course, only an edge portion of the movable arm 540 but the embossed portion of the movable arm 540 may make contact with the second bimetal 530. However, this may also result in a non-uniform pressing pressure. In addition, errors may occur because the movable arm 540 is excessively permanently deformed by the second bimetal 530.

However, according to the presently disclosed embodiment, the second bimetal 530 has a long axis N and a short axis M, and the short axis M coincides with the length L of the movable arm 540. Therefore, even when the first bimetal 520 undergoes a creep-action period and the second bimetal 530 is pushed upward by the operation of the first bimetal 520, there is a gap between the outer edge of the second bimetal 530 and the movable arm 540. That is, the outer edge of the second bimetal 530 does not come into contact with the movable arm 540. In particular, during the creep-action period, interference does not occur between the second bimetal 530 and the movable arm 540.

Therefore, since the movable arm 540 and the second bimetal 530 make contact with each other only at the embossed portion 548, the pressing force that the movable arm 540 applies to the first bimetal 520 and the second bimetal 530 may be maintained uniformly, and the operating temperature, the operating time, the return temperature, and the return time may be maintained constant. Thus, operation and returning may be performed at exact temperatures.

In this case, as shown in a portion C of FIG. 14, the center of the embossed portion 548, the center of the first bimetal 520, and the center of the second bimetal 530 may be superposed. Here, the expression "superposed" may be construed as indicating that the centers of the curved surfaces of the embossed portion 548, the first bimetal 520, and the second bimetal 530 are coincident with each other and are superposed along a single vertical axis. Thus, when the curved surfaces of the first and second bimetals 520 and 530 are inverted as the first bimetal 520 and the second bimetal 530 are deformed, the highest points of the first and second bimetals 520 and 530 may coincident with the lowest point of the embossed portion 548.

Hereinafter, the operation of the overload protection means will be described with reference to FIGS. 15 to 18.

Figure 15:
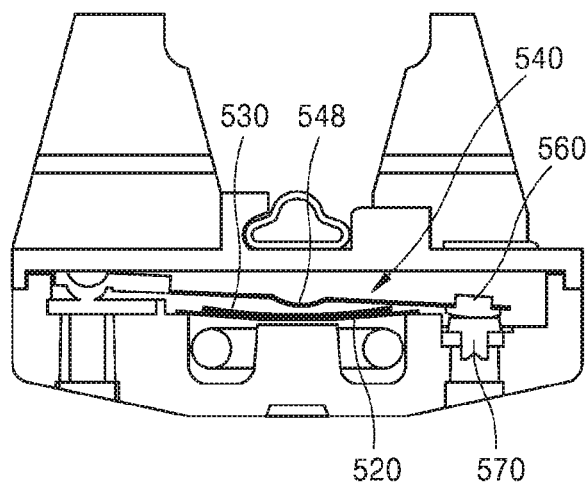
FIGS. 15 to 17 are views illustrating an operation of an overload protection means of the overload protection device for a compressor motor according to an aspect of the presently disclosed embodiment.

FIG. 15 is a view illustrating a state being equal to or lower than the first operating temperature. Firstly, as shown in FIG. 15, at a temperature equal to or lower than first operating temperature, each of the first bimetal 520 and the second bimetal 530 does not operate and maintains in a downwardly convex shape. At this time, the movable contact terminal 560 of the movable arm 540 is in contact with the fixed contact terminal 570.

Figure 16:
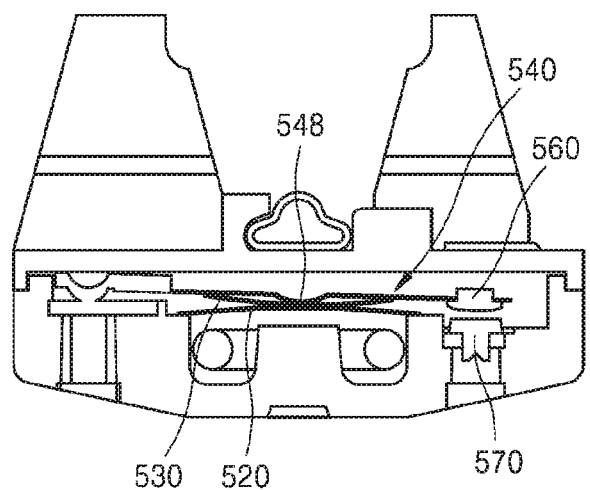

FIG. 16 is a view illustrating a state in which the first bimetal 520 reaches the first operating temperature and operates. As shown in FIG. 16, when the first bimetal 520 reaches the first operating temperature, the first bimetal 520 deforms in an upwardly convex shape. At this time, although the second bimetal 530 does not deform, the second bimetal 530 is pushed upward by the first bimetal 520. In addition, the movable contact terminal 560 of the movable arm 540 is spaced apart from the fixed contact terminal 570, and current is cut off. At this time, as described above, there is no interference contact between the edge of the second bimetal 530 and the movable arm 540, and only the embossed portion 548 of the movable arm 540 is brought into contact with the second bimetal 530 and pushed by the second bimetal 530. Therefore, the operating pressure and temperature, and the return pressure and temperature may be maintained constant.

Figure 17:
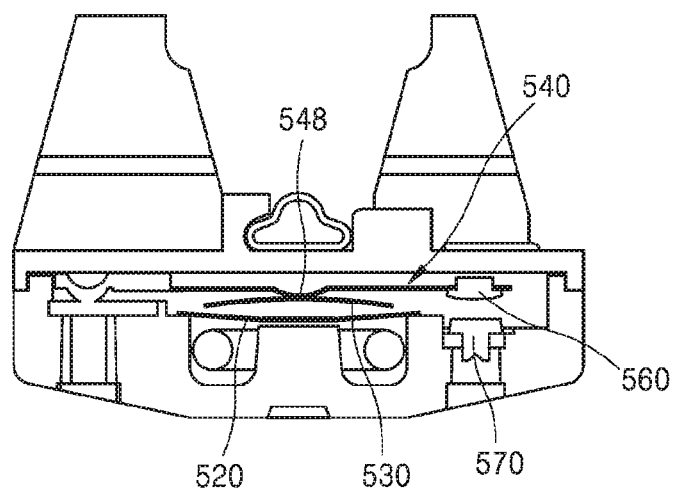

FIG. 17 is a view illustrating a state in which the first bimetal 520 does not deform because of an abnormal operation, and the second bimetal 530 reaches the second operating temperature and operates.

If the first bimetal 520 does not deform at the first operating temperature due to an abnormal operation, heating continues even at a temperature higher than the first operating temperature. At this time, if the second bimetal 530 reaches the second operating temperature, the second bimetal 530 deforms. In this case, only the second bimetal 530 deforms in an upwardly convex shape and pushes up the movable arm 540 in a state in which the first bimetal 520 does not deform. Therefore, the movable contact terminal 560 of the movable arm 540 is spaced apart from the fixed contact terminal 570, and thus current is interrupted. Therefore, overheating may be prevented.

Figure 18:
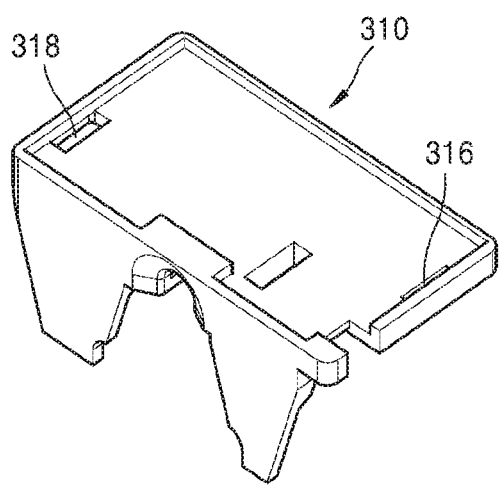
FIG. 18 is a view illustrating a cover of the overload protection device for a compressor motor according to an aspect of the presently disclosed embodiment.
Figure 19:
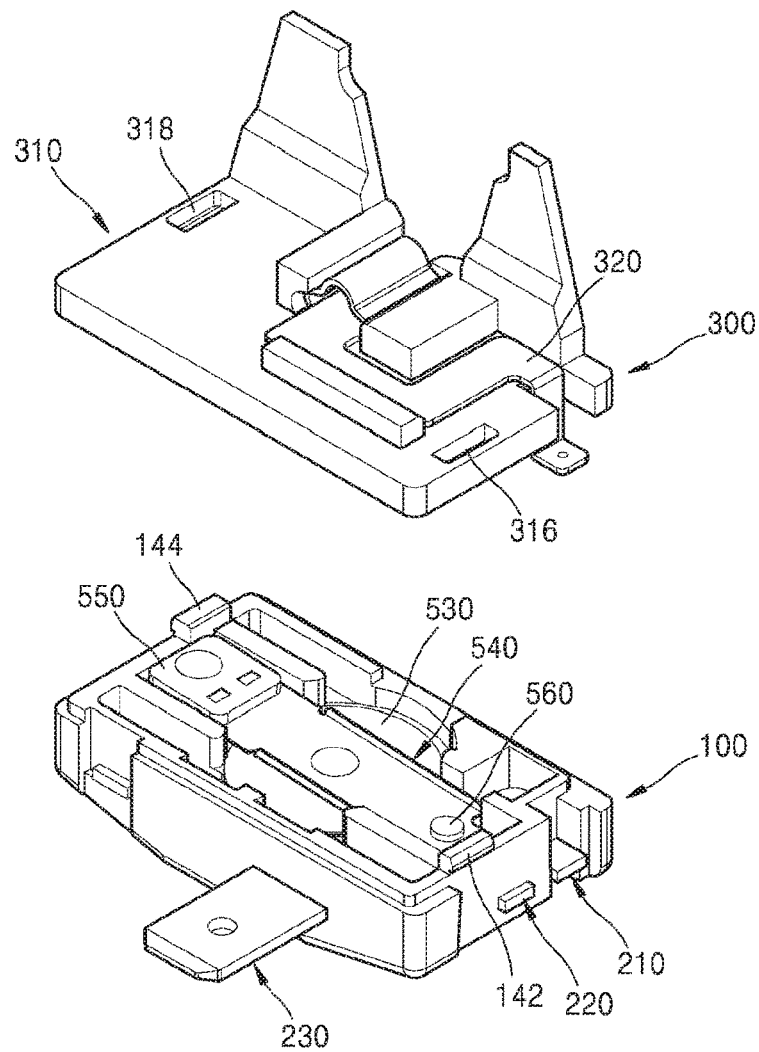
FIG. 19 is a view illustrating coupling between the base and the cover of the overload protection device for a compressor motor according to an aspect of the presently disclosed embodiment.

Hereinafter, the cover 300 will be described with reference to FIGS. 18 and 19.

The cover 300 is provided to cover the base 100 after the fuse unit 400 and the overload protection means 500 are accommodated in the base 100. The cover 300 may include a cover body 310 and a connection terminal 330 coupled to the cover body 310. The connection terminal 330 may extend from the cover body 310 and make contact with the input terminal 202 to facilitate electrical connection with an external electric device. A fixing means may be provided on the cover body 310 to couple the connection terminal 330 to the cover body 310.

In addition, preferably, the cover 300 and the base 100 may be connected to each other by a hook structure. For example, the base 100 may include hooks 142 and 144 protruding upward, and the cover 300 may include hook coupling portions 316 and 318 for connection with the hooks 142 and 144. Therefore, the hooks 142 and 144 may be coupled to the hook coupling portions 316 and 318 by inserting the hooks 142 and 144 into the hook coupling portions 316 and 318, and in this manner, the cover 300 and the base 100 may be easily connected to each other.

In addition, preferably, concave and convex surfaces corresponding to each other may be formed on mutually-facing surfaces of the cover 300 and the base 100. That is, concave-convex portions may be formed on contact portions of the cover 300 and the base 100, and the concave-convex portions may be correspondingly coupled to each other in order to seal the inside of the base 100 more securely.

Hereinafter, effects of the overload protection device 1 for a compressor motor will be described according to the presently disclosed embodiment.

According to the overload protection device 1 for a compressor motor of the presently disclosed embodiment, if a predetermined amount of power is applied to the overload protection device 1 and the overload protection device 1 reaches a predetermined operating temperature, the bimetal H deforms to interrupt electrical connection, and thus the compressor motor may be easily simply prevented from being overloaded.

In addition, when the first bimetal 520 deforms in an upwardly convex shape at the first operating temperature, contact interference does not occur between a lateral portion of the second bimetal 530 and the movable arm 540 but the second bimetal 530 and the movable arm 540 come into contact with each other only at the embossed portion 548, and thus the movable arm 540 may apply a constant pressing force to the first bimetal 520 and the second bimetal 530.

Therefore, the temperature at which the first bimetal 520 returns to its original shape may be constant, and thus the first bimetal 520 may have a constant operating temperature and a return temperature. In particular, interference between the second bimetal 530 and the movable arm 540 may be prevented during the creep action of the first bimetal 520.

In addition, according to the presently disclosed embodiment, since the center axis of the curvature of the embossed portion 548 of the movable arm 540 is coincident with the center axis of the curvature of the bimetal H in a vertical direction, a pressing force applied to the bimetal H by the movable arm 540 and a force applied to the movable arm 540 by the bimetal H are constant.

Figure 20:
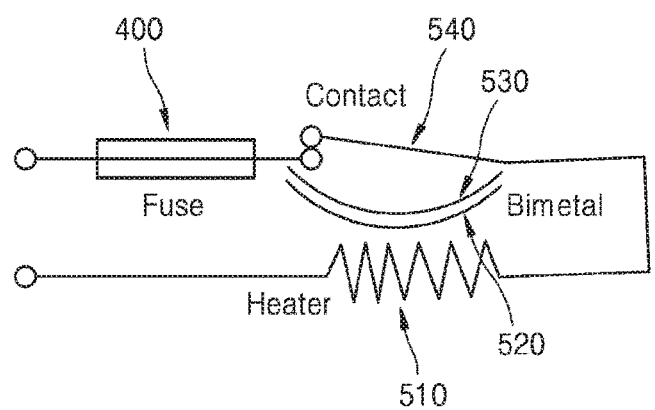
FIG. 20 is a circuit diagram illustrating the overload protection device for a compressor motor according to an aspect of the presently disclosed embodiment.

In addition, according to the presently disclosed embodiment, the overload protection device 1 includes the first input terminal 210 and the second input terminal 220 connected to each other through the fuse unit 400, and the fuse unit 400 is configured to be cut if an overcurrent flows. Therefore, protection against an overcurrent as well as overheating may be provided. That is, since the overload protection device 1 includes a circuit diagram as shown in FIG. 20, protection against an overcurrent may be provided by the fuse unit 400 in addition to protection against overheating provided by the bimetal H.

In addition, according to the presently disclosed embodiment, conductive members for conducting electricity are sealed and isolated by embedding the conductive members in the base 100 formed of an insulative material, and thus the phenomenon in which radiant heat is generated by arcs reflected from a conductor during switching may be prevented. That is, in the related art, during the switching operation of the fixed contact 542 and the movable contact 544 of the movable arm 540, arcs may be generated and reflected. However, according to the presently disclosed embodiment, the input terminal 202, the output terminal 230, and the intermediate terminal 240 are embedded in the base 100 as described above, thereby preventing generation and reflection of arcs.

In addition, according to the presently disclosed embodiment, since conductive members of the overload protection device 1 are integrally formed in the base 100 which is an insulator, the conductive members may be securely fixed. That is, even though the base 100 deforms when the overload protection device 1 is electrically, physically, or thermally impacted, the conductive members may be stably fixed, thereby reducing device failures. That is, as described above, the input terminal 202, the output terminal 230, and the intermediate terminal 240 are embedded in the base 100 by injecting a molten plastic material in a mold in which the input terminal 202, the output terminal 230, and the intermediate terminal 240 are arranged. That is, such conductive members may be embedded in the base 100 in this manner. Therefore, such members may be stably fixed to the base 100.

In addition, according to the presently disclosed embodiment, an assembling process for inserting such conductive members into the base 100 may be omitted, and thus overload protection devices 1 may be automatically manufactured with fewer deviations. Thus, products having uniform characteristics may be manufactured. In addition, the presently disclosed embodiment provides a structure in which conductive members are formed integrally with the base 100 instead of a structure in which conductive members are inserted into the base 100, thereby preventing electrical connection failures caused by pieces separated from the base 100 and entering between the fixed contact 542 and the movable contact 544 when conductive members are inserted into the base 100.

Furthermore, according to the presently disclosed embodiment, since conductive members are embedded in the base 100, heat generated from a conductive member used as a heating element may be minimally transferred by radiation and conduction, thereby reducing thermal deformation of the overload protection device 1 and ensuring accurate operations of the overload protection device 1. That is, since the cover regions 122, 124, 126, and 128, and the barrier walls 132 and 134 are provided to embed conductive members in the base 100 and prevent unnecessary heat transfer, unintended unnecessary thermal radiation to the bimetal 520 may be prevented, thereby guaranteeing operations at exact operating temperatures.

Further, according to the presently disclosed embodiment, the inside of the base 100 is entirely hermetically sealed with an insulator, and connection portions between terminals are sealed and isolated. Therefore, internal explosion does not cause external explosion, and permeation of external combustible gases is prevented, thereby guaranteeing safety.

In addition, according to the presently disclosed embodiment, concave-convex portions are formed on the base 100 and the cover 120, and the cover 120 is coupled to the base 100 by covering the base 100 with the cover 120. Therefore, the base 100 and the cover 120 may be securely coupled to each other, and thus the inside of the base 100 may be reliably sealed to prevent permeation of external water, gas, dust, etc., thereby reducing product failures.

Hereinafter, an overload protection device 1 for a compressor motor will be described with reference to FIGS. 21 to 37 according to another aspect of the presently disclosed embodiment.

Figure 21:
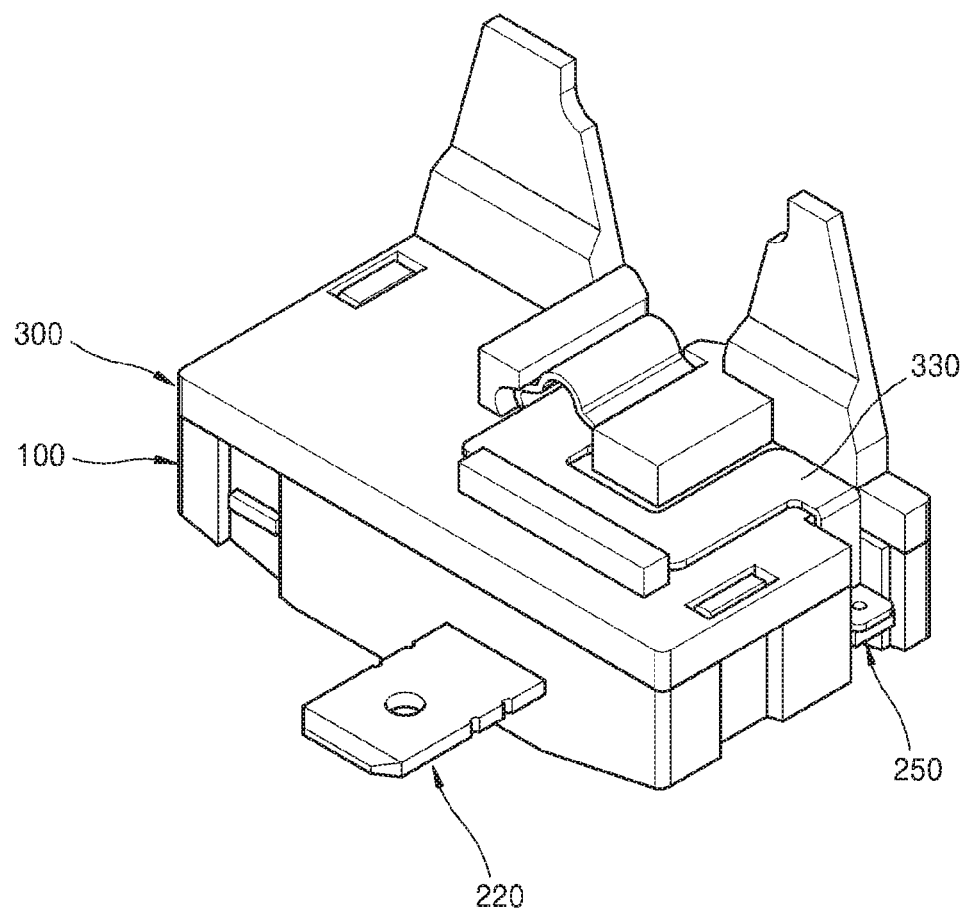
FIG. 21 is a view illustrating an overload protection device for a compressor motor according to a second aspect of the presently disclosed embodiment.
Figure 22:
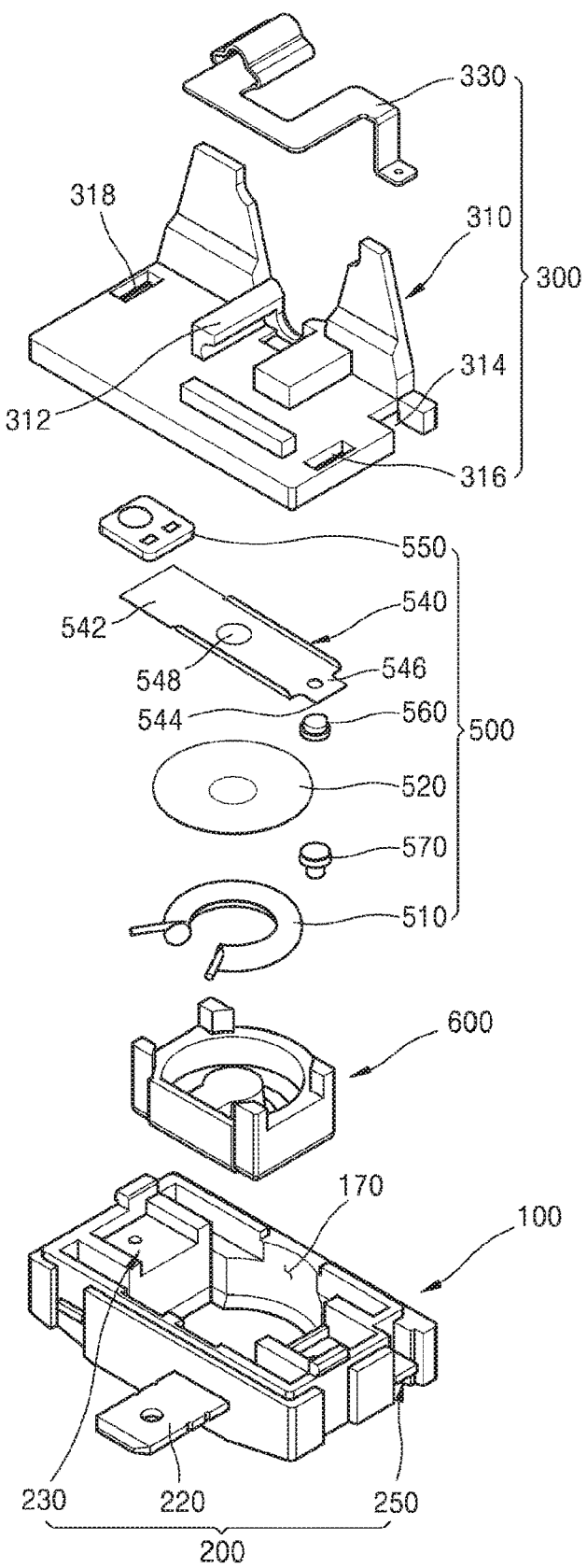
FIG. 22 is a view illustrating a structure of the overload protection device for a compressor motor according to the second aspect of the presently disclosed embodiment.

FIG. 21 is a view illustrating an overload protection device 1 for a compressor motor according to another aspect of the presently disclosed embodiment, and FIG. 22 is a view illustrating the structure of the overload protection device 1 for a compressor motor depicted in FIG. 21.

According to the present aspect of the presently disclosed embodiment, the overload protection device 1 further include includes a heater holder 600.

A base 100, a conductive terminal 200, a cover 300, a overload protection means 500 of the present aspect are generally the same as those described in the previous aspect, and a fuse unit 400 is also provided in the present aspect. In the following description, differences from the previous aspect will be described.

The base 100 includes an installation space 170 such that the heater holder 600 (described later) may be accommodated and mounted in the installation space 170. The installation space 170 is a space recessed downward and having a predetermined volume. The installation space 170 has a tetragonal outer shape corresponding to the shape of the heater holder 600, and a first curved surface 174 may be formed on a portion of an inner circumferential surface of the installation space 170.

Figure 23:
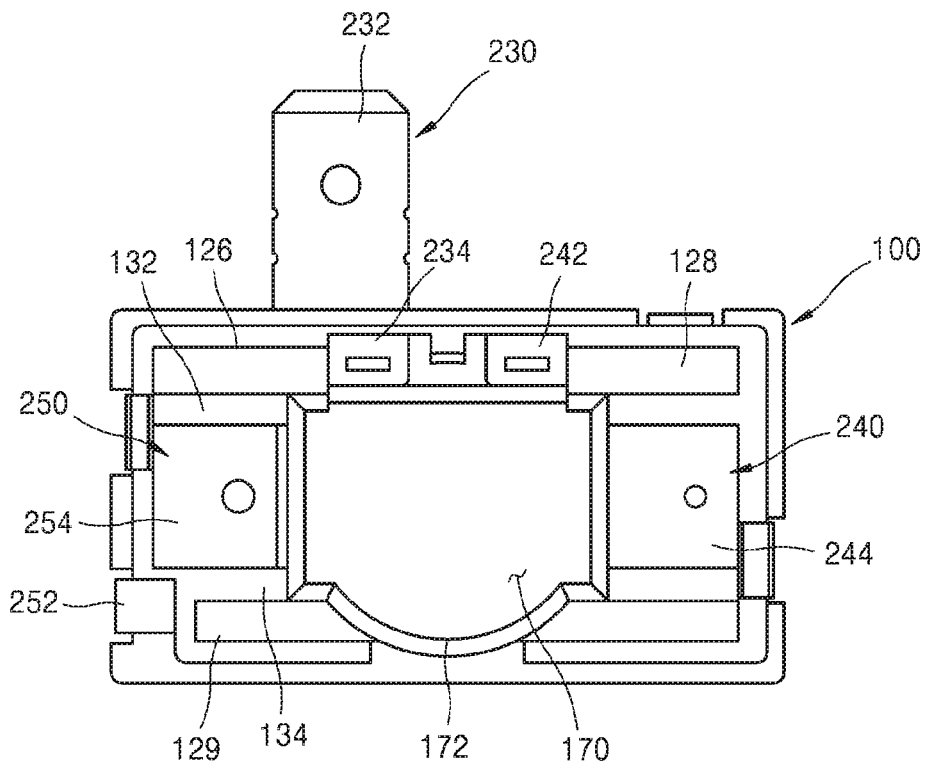
FIGS. 23 to 25 are views illustrating a base and a conductive terminal coupled to the base in the overload protection device for a compressor motor according to the second aspect of the presently disclosed embodiment.
Figure 24:
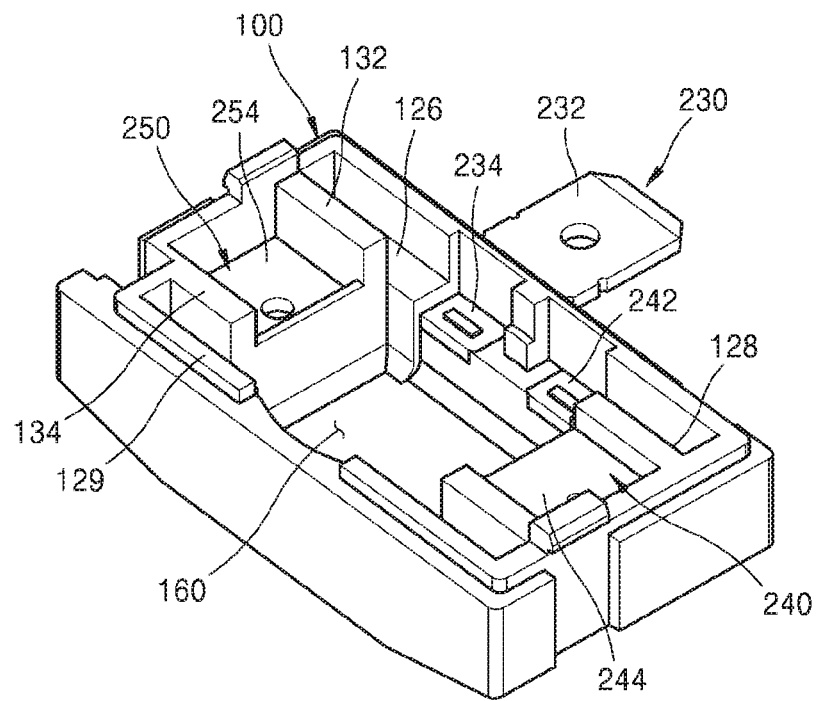
Figure 25:
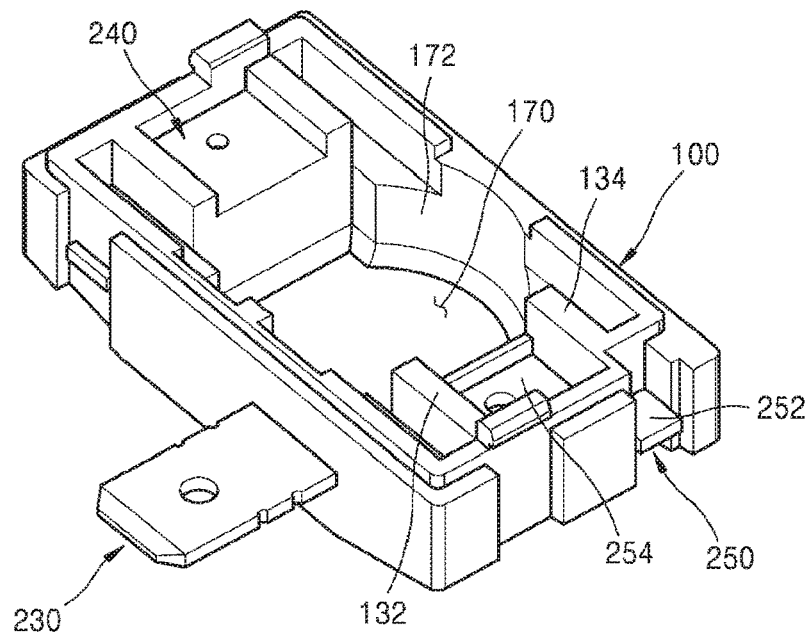
Figure 26:
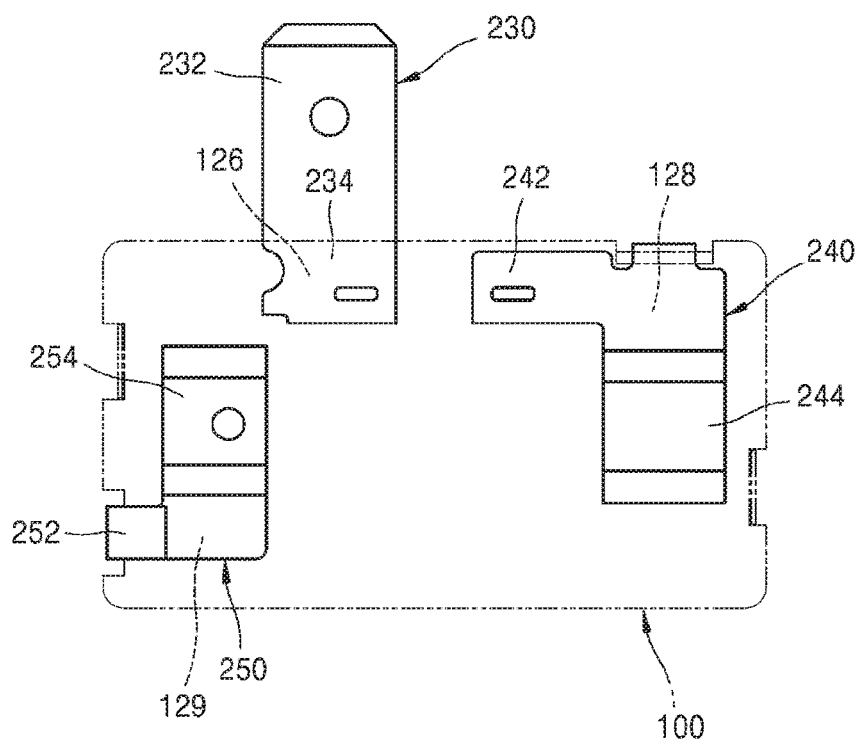
FIG. 26 is a view illustrating the conductive terminal coupled to the base in the overload protection device for a compressor motor according to the second aspect of the presently disclosed embodiment.

FIGS. 23 to 25 are views illustrating the base 100 and the conductive terminal 200 coupled to the base 100 in the overload protection device 1 for a compressor motor illustrated in FIG. 22.

The conductive terminal 200 is a conductive electrical terminal including an input terminal 250, an output terminal 230, and an intermediate terminal 240 that are embedded in the base 100. Here, the output terminal 230 and the intermediate terminal 240 are the same as those described in the previous aspect.

Here, the input terminal 250 is different from the input terminal 202 of the previous aspect in that the input terminal 250 is provided as a one-piece terminal instead of including a first input terminal 210 and a second input terminal 220. However, the previous aspect in which the first input terminal 210 and the second input terminal 220 are provided below the fuse unit 400 may be applied to the present aspect. That is, aspects are not exclusive of each other.

The input terminal 250 has an internally exposed surface 254 exposed inside the base 100 and an externally exposed surface 252 connected to an external electrical device, and a portion of the input terminal 250 between the internally exposed surface 254 and the externally exposed surface 252 is embedded and sealed by surrounding the portion with an insulative material of the base 100. That is, a portion between the externally exposed surface 252 and the internally exposed surface 254 may be embedded and sealed by surrounding the portion with the insulative material of the base 100. To this end, the base 100 may include a cover region 129 covering the input terminal 250, and may be formed by injecting and hardening a predetermined material in a mold in which the input terminal 250 is placed. In addition, a fixed contact terminal 570 may be provided on the internally exposed surface 254 so as to facilitate electrical contact with a movable arm 540 (described later).

Figure 36:
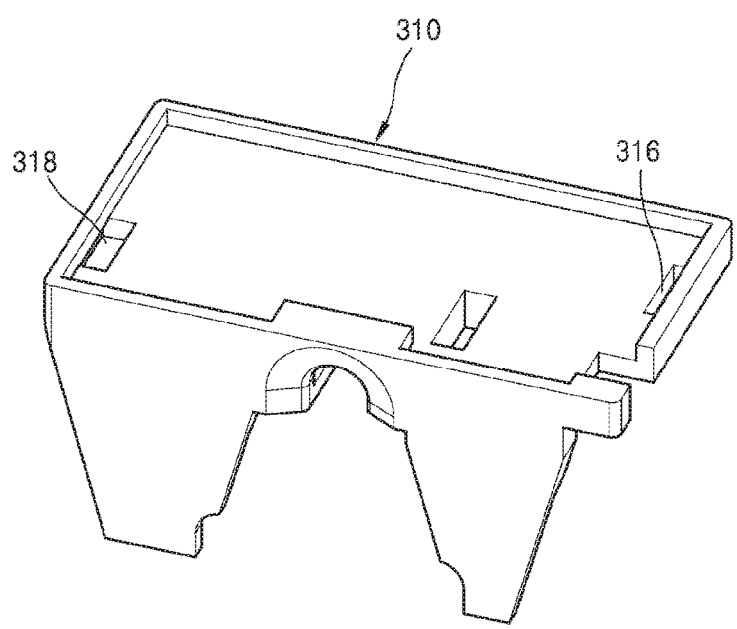
FIG. 36 is a view illustrating a cover of the overload protection device for a compressor motor according to the second aspect of the presently disclosed embodiment.
Figure 37:
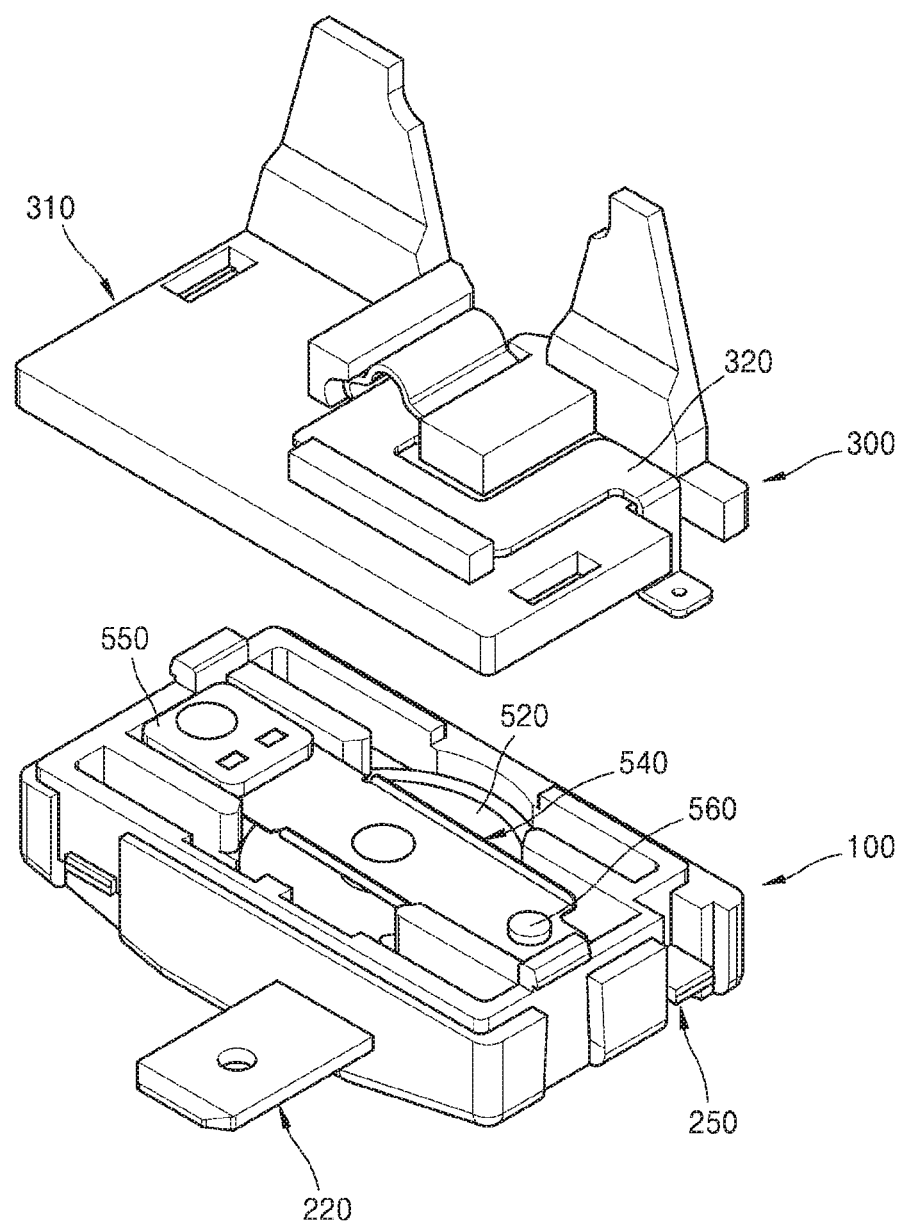
FIG. 37 is a view illustrating coupling between the base and the cover of the overload protection device for a compressor motor according to the second aspect of the presently disclosed embodiment.

The cover 300 may be coupled to the base 100 and may be configured as described in the previous aspect. That is, the cover 300 is configured as illustrated in FIGS. 36 and 37.

In the present aspect, the overload protection means 500 includes a resistance heating element 510; the movable arm 540; a bimetal H; and a fixing iron piece 550.

In the present aspect, the bimetal H of the overload protection means 500 is illustrated as including only a first bimetal 520. The overload protection means 500 may include only one bimetal as illustrated in the drawings, two bimetals as described in the previous aspect, or three or more bimetals. That is, the number of bimetals is not limited.

In the present aspect, the operation of the overload protection means 500 is similar to that described in the previous aspect.

Figure 31:
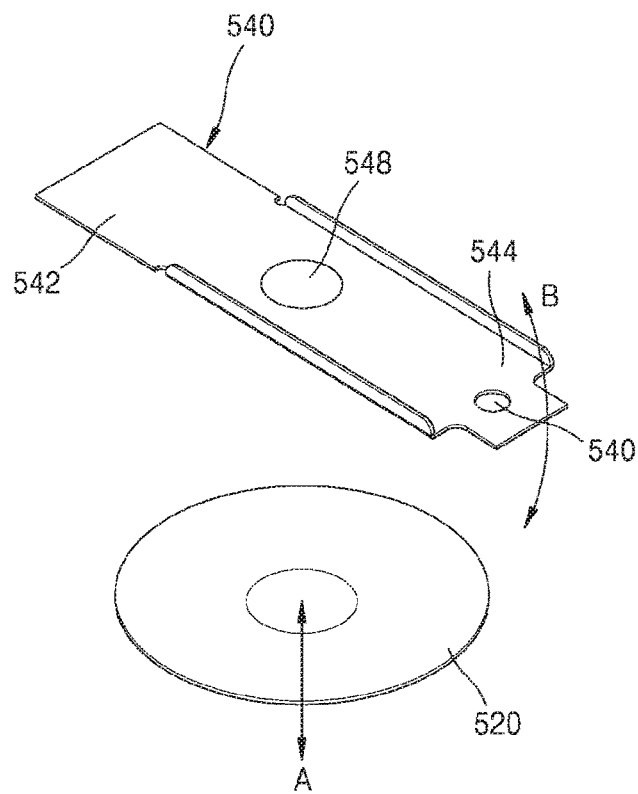
FIGS. 31 to 35 are views illustrating an operation between a bimetal and a movable arm of the overload protection device for a compressor motor according to the second aspect of the presently disclosed embodiment.

That is, as shown in FIGS. 31 to 35, the first bimetal 520 may be configured to push up the movable arm 540 disposed above the first bimetal 520 while the first bimetal 520 undergoes thermal deformation. Referring to FIG. 31, the movable arm 540 is pushed by thermal deformation of the first bimetal 520 indicated by an arrow A, and thus a movable contact 544 tilts about a fixed contact 542 as indicated by an arrow B. Then, the movable contact 544 is moved upward, and thus the distance between the movable contact 544 and the input terminal 250 increases such that contact and electric connection between the movable contact 544 and the input terminal 250 may be broken. As described above, since the movable arm 540 is formed of an elastically deformable resilient material, it is apparent that as the first bimetal 520 reaches a predetermined return temperature and returns to its original shape, the movable arm 540 returns to its original shape, and the movable contact 544 and the input terminal 250 are electrically re-connected to each other.

As illustrated in FIG. 31, the first bimetal 520 has a disc shape having a predetermined area, that is, a curved dish shape. As the first bimetal 520 undergoes thermal deformation, the recessed direction of the first bimetal 520 may be inverted to deform the movable arm 540.

Figure 33:
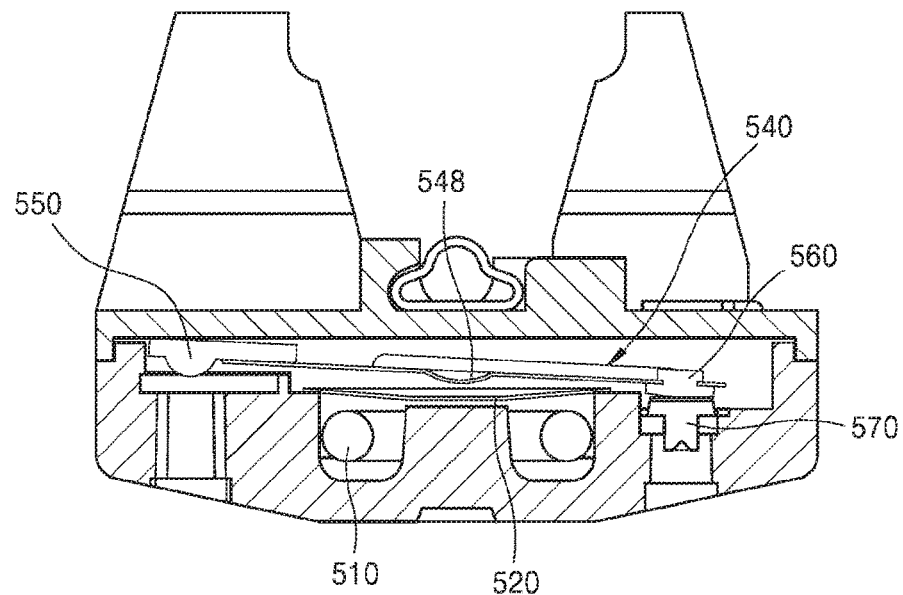
Figure 35:
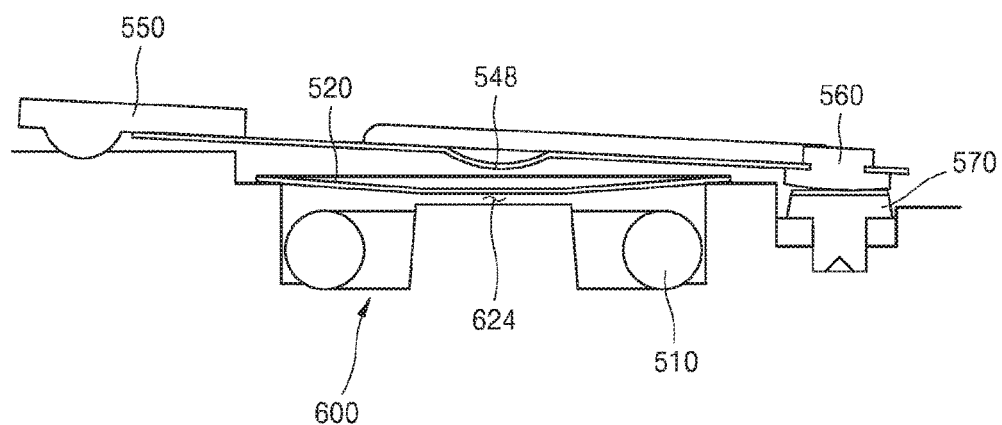

Here, in a normal state in which the first bimetal 520 is not thermally deformed as shown in FIGS. 33 and 35, the first bimetal 520 has a downwardly recessed dish shape and thus does not make contact with the movable arm 540.

Figure 32:
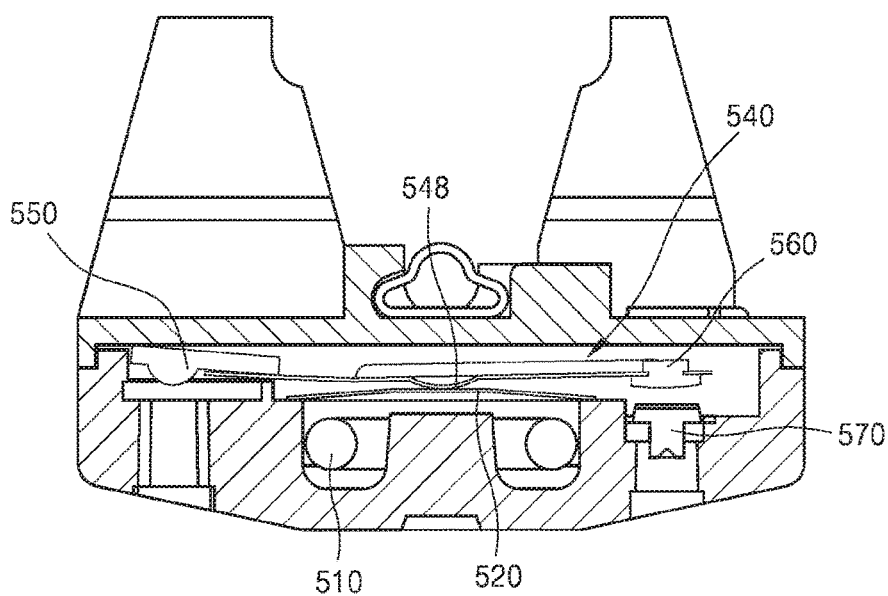
Figure 34:
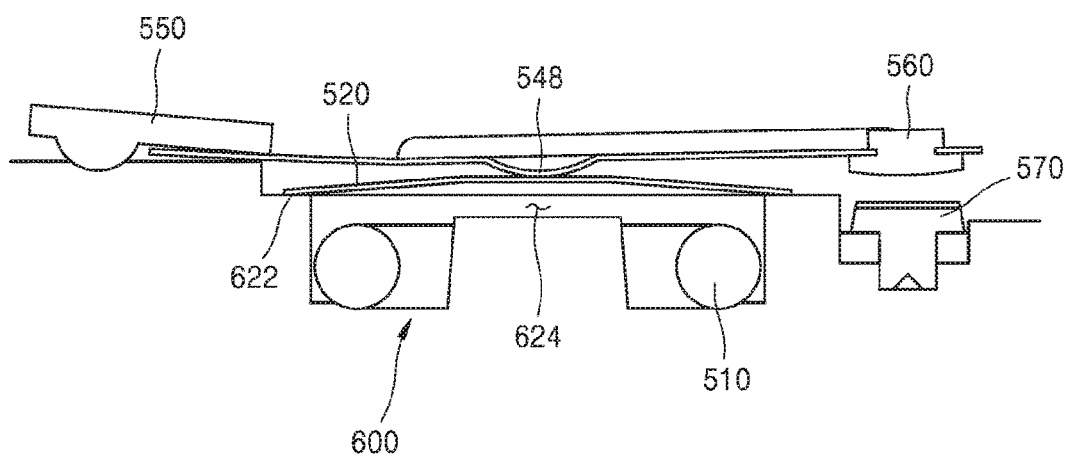

However, if the first bimetal 520 is thermally deformed as shown in FIGS. 32 and 34, the recessed direction of the first bimetal 520 is inverted to form an upwardly recessed dish shape, and thus the movable arm 540 may be pushed upward by the first bimetal 520.

Hereinafter, the heater holder 600 will be described with reference to FIGS. 27 to 30.

Figure 30:
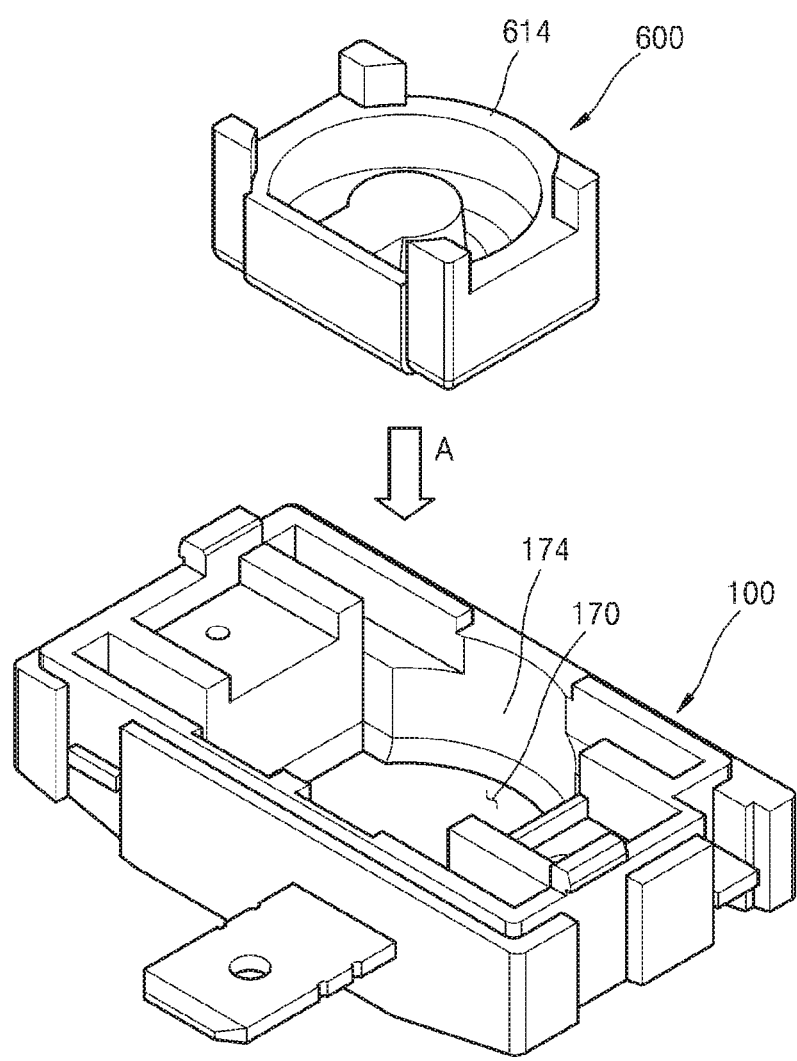
FIG. 30 is a view illustrating coupling between the base and the heater holder of the overload protection device for a compressor motor according to the second aspect of the presently disclosed embodiment.

The heater holder 600 is a member accommodated in the installation space 170 as indicated with an arrow A in FIG. 30, and as described above, the heater holder 600 has a shape corresponding to the shape of the installation space 170. To this end, a second curved surface 614 corresponding to the first curved surface 174 formed on the inner circumferential surface of the installation space 170 may be formed on a portion of an outer surface of the heater holder 600.

Figure 27:
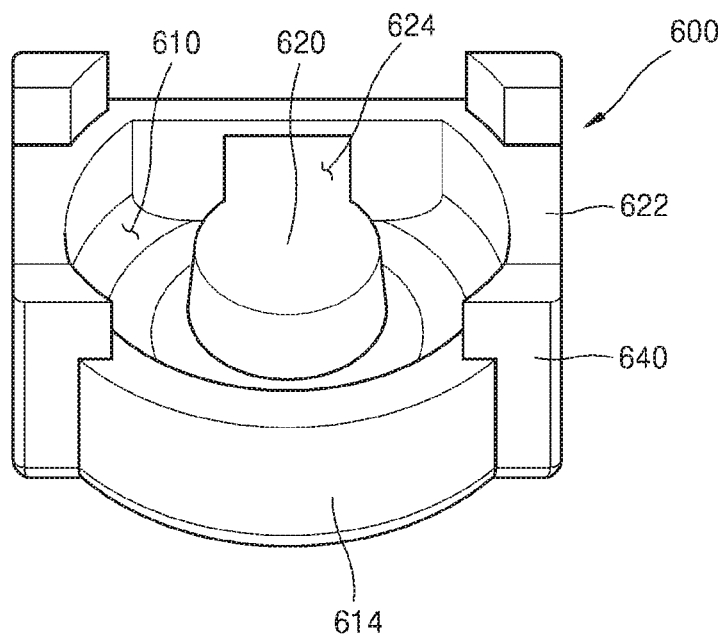
FIGS. 27, 28, and 29 are views illustrating a structure of a heater holder of the overload protection device for a compressor motor according to the second aspect of the presently disclosed embodiment.

The heater holder 600 has an accommodation space 610 having a predetermined depth and volume to accommodate the resistance heating element 510 of the overload protection means 500. The accommodation space 610 may have an arc shape corresponding to the shape of the resistance heating element 510. Thus, as shown in FIG. 27, the accommodation space 610 may have a ring shape as a whole, and a guide portion 620 may be provided in the accommodation space 610 at a center position of the arc shape of the accommodation space 610 to guide the resistance heating element 510 in an arc shape.

Figure 28:
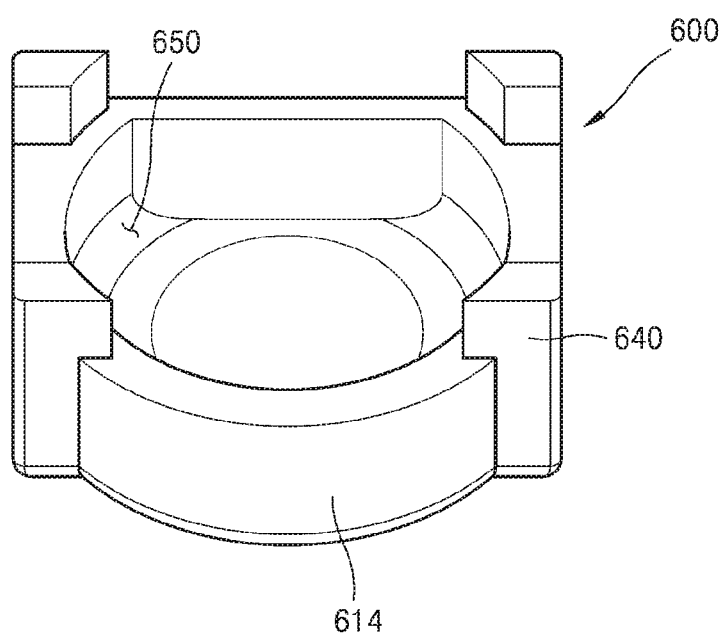
Figure 29:
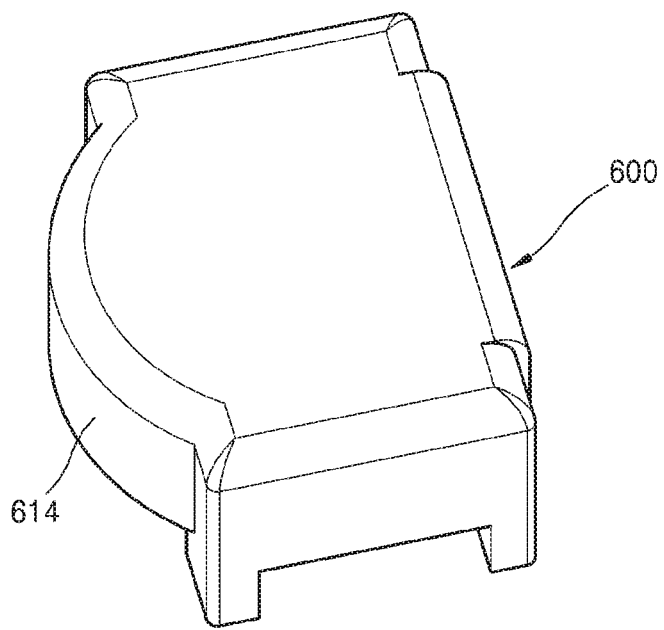

In addition, according to another aspect as shown in FIG. 28, the accommodation space 610 may have a shape similar to a circle without the guide portion 620. That is, the accommodation space 610 is not limited to a particular shape.

A side wall 622 having a predetermined height and forming an outer periphery of the heater holder 600 is provided around the accommodation space 610. The height of at least a portion of the side wall 622 may be higher than the height of the guide portion 620. Therefore, a space 624 having a predetermined height is formed between an upper surface of the side wall 622 and an upper surface of the guide portion 620.

In addition, upper extensions 640 may protrude upward from four outer corners of the side wall 622. That is, the upper extensions 640 protrude from upper portions of the heater holder 600. Therefore, when the base 100 and the cover 300 are coupled to each other in a state in which the heater holder 600 is accommodated in the installation space 170, upper ends of the upper extensions 640 are brought into contact with the cover 300, and thus the position of the heater holder 600 may be fixed. That is, the upper extensions 640 are vertically extending parts provided to fix the position of the heater holder 600 between the cover 300 and the base 100. Preferably, the upper extensions 640 may be respectively provided on outer corner portions of the heater holder 600. In addition, after the heater holder 600 is inserted into the installation space 170, the upper extensions 640 may form inner ends of first and second barrier walls 132 and 134.

In the above-described structure of the heater holder 600, an outer edge of the first bimetal 520 is placed and supported on the side wall 622. In this case, before the first bimetal 520 reaches a first operating temperature, a downwardly curved portion of the first bimetal 520 is located in the space 624 and does not touch the movable arm 540. When the first bimetal 520 reaches the first operating temperature, the first bimetal 520 snaps in a state in which the outer edge of the first bimetal 520 is supported on the side wall 622, and thus a center portion of the first bimetal 520 protrudes upward and pushes up the movable arm 540.

Since the degree of heat generation may vary depending on the type of the resistance heating element 510 of the overload protection means 500, the heater holder 600 needs to include a material resistant to high temperatures. Therefore, a heat-resistant thermosetting resin such as polyester, a phenolic resin, or a ceramic material may be included in the heater holder 600. It is difficult to manufacture the base 100 using a ceramic material or a material having a high heat distortion temperature by an injection molding method. Thus, according to the presently disclosed embodiment, a material having a high heat distortion temperature such as a ceramic material may be injection molded into the heater holder 600, and the heater holder 600 may be coupled to the base 100 or insert molded into the base 100. Therefore, although the resistance heating element 510 generates heat and forms a high-temperature environment, it is possible to maintain overall performance and prevent damage. In addition, the heater holder 600 may be assembled to the base 100 by using a dual injection method or mounting the heater holder 600 on the base 100.

According to the present aspect, instead of directly mounting the resistance heating element 510 in the base 100, the heater holder 600 is separately provided, and the resistance heating element 510 is mounted in the heater holder 400. In this state, the heater holder 600 is mounted in the base 100, thereby improving productivity and reducing production cost.

That is, in the related art, the resistance heating element 510 is directly mounted in the base 100, and thus it has to manufacture separate bases 100 according to the type, shape, and specifications of resistance heating elements 510. However, according to the presently disclosed embodiment, only the heater holder 600 is separately manufactured and mounted in the base 100. Thus, various heating elements may be used with the base 100, and heater holders 600 formed of various materials may be manufactured according to heating conditions, thereby improving productivity and reducing production cost.

In addition, since the heater holder 600 formed of a material having a high heat distortion temperature is provided separately from the base 100, machining may be easily performed, and protection against much higher temperatures may be provided.

Although preferable aspects have been described with reference to the accompanying drawings, the presently disclosed embodiment is not limited to the aspects. Therefore, it will be readily understood by those skilled in the art that various modifications and changes can be made thereto without departing from the spirit and scope of the presently disclosed embodiment defined by the appended claims, and these modifications and changes should not be construed independently of the spirit and scope of the presently disclosed embodiment.

What is claimed is:

1. An overload protection device for a compressor motor, the overload protection device comprising:
    a base formed of an insulative material and comprising an inner space;
    a conductive terminal comprising an input terminal, an output terminal, and an intermediate terminal;
    an overload protection means placed in the inner space of the base; and
    a cover configured to cover the base,
    wherein the input terminal and the output terminal are at least partially embedded in the base and at least partially exposed inside the inner space, and
    the intermediate terminal is placed between the input terminal and the output terminal, the intermediate terminal being at least partially embedded in the base and at least partially exposed inside the inner space,
    wherein the overload protection means comprises:

a resistance heating element capable of conducting electricity and having a predetermined electrical resistance value;

a movable arm comprising a material having electrical conductivity and elastic resilience, the movable arm being placed above the resistance heating element and having a predetermined length, the movable arm extending in a length direction thereof; and a bimetal placed between the resistance heating element and the movable arm, the bimetal deforming in shape at a predetermined operating temperature and returning to an original shape thereof at a predetermined return temperature, wherein the resistance heating element is electrically connected to the output terminal at one end thereof and electrically connected to the intermediate terminal at the other end thereof, the resistance heating element generating heat when conducting electricity, wherein a lengthwise end of the movable arm forms a fixed contact that is fixed to and electrically connected to the intermediate terminal, and the other lengthwise end of the movable arm forms a movable contact configured to make contact with the input terminal and vary in position, such that the movable arm electrically connects the input terminal and the intermediate terminal, wherein electrical connection between the movable contact and the input terminal is broken and made in such a manner that when the bimetal deforms in shape at a temperature equal to or higher than the operating temperature, the movable contact is spaced apart from the input terminal, and when the bimetal returns to the original shape thereof at a temperature equal to or lower than the return temperature, the movable contact and the input terminal come into contact with each other;

wherein the bimetal comprises a first bimetal and a second bimetal placed on the first bimetal, wherein the first bimetal is shaped like a disc curved downward in a concave dish shape and deforms and snaps at a first operating temperature in an upwardly protruding curved shape, wherein the second bimetal has a downwardly curved concave dish shape and deforms and snaps at a second operating temperature in an upwardly protruding curved shape, wherein the second operating temperature is higher than the first operating temperature.

2. The overload protection device of claim 1, wherein the second bimetal has a long axis with a relatively long width and a short axis with a width smaller than the long axis, wherein the short axis is coincident the length direction of the movable arm, and an outer edge of the second bimetal is spaced apart from the movable arm such that contact interference does not occur between the outer edge of the second bimetal and the movable arm.

3. The overload protection device of claim 2, wherein the second bimetal has a rectangular shape with the long axis and the short axis, and an end of the second bimetal in the long axis is rounded.

4. The overload protection device of claim 2, wherein the inner space comprises:

a first accommodation portion formed in a lower region and having an arc shape with a predetermined depth and diameter; and a second accommodation portion formed above the first accommodation portion, wherein the resistance heating element is accommodated in the first accommodation portion, and the first bimetal, the second bimetal, and the movable arm are accommodated in the second accommodation portion.

5. The overload protection device of claim 4, wherein a first barrier wall and a second barrier wall are arranged in the second accommodation portion of the base, the first and second barrier walls protruding upward, extending lengthwise, spaced part from each other in a width direction thereof by a first distance, and being parallel with each other, wherein in a state in which the resistance heating element is accommodated in the first accommodation portion and the first and second bimetals are accommodated in the second accommodation portion, the movable arm is accommodated between the first and second barrier walls.

6. The overload protection device of claim 5, wherein the first barrier wall comprises a first first barrier wall and a first second barrier wall that are respectively placed on both sides of the first accommodation portion and are spaced apart from each other with the first accommodation portion being therebetween, wherein the second barrier wall comprises a second first barrier wall and a second second barrier wall that are respectively placed on both sides of the first accommodation portion and are spaced apart from each other with the first accommodation portion being therebetween.

7. The overload protection device of claim 6, wherein the first distance corresponds to a width of the movable arm, and a distance between the first first barrier wall and the first second barrier wall and a distance between the second first barrier wall and the second second barrier wall correspond to a length of a short axis of the second bimetal.

8. The overload protection device of claim 2, wherein the movable arm comprises an embossed portion at a center portion in the length direction of the movable arm, the embossed portion being rounded and protruding downward, wherein when the first bimetal or the second bimetal snaps, the embossed portion is pushed, and electrical connection between the input terminal and the output terminal through the movable arm is broken.

9. The overload protection device of claim 8, wherein a center of the embossed portion, a center of the first bimetal, and a center of the second bimetal are superposed to form a single axis in a vertical direction.

10. The overload protection device of claim 1, wherein the resistance heating element comprises a heating coil wound to have a predetermined length and curved with a curvature, and the movable arm is placed above the heating coil and crossing the heating coil in a diameter direction of the heating coil.

11. The overload protection device of claim 1, further comprising a fuse unit placed in the base, wherein the fuse unit is electrically connected in series to the conductive terminal and comprises a fuse line configured to be cut when a current equal to a higher than a predetermined value flows through the fuse line.

12. The overload protection device of claim 11, wherein the input terminal comprises a first input terminal and a second input terminal spaced apart from the first input terminal, wherein the fuse unit comprises a first fuse terminal and a second fuse terminal, and the fuse line connects the first fuse terminal and the second fuse terminal, wherein the first fuse terminal is electrically connected to the first input terminal, and the second fuse terminal is electrically connected to the second input terminal.

13. The overload protection device of claim 12, wherein the base comprises:

a first exposure recess in which at least a portion of the first input terminal is exposed upward;

a second exposure recess in which at least a portion of the second input terminal is exposed upward; and a channel formed between the first exposure recess and the second exposure recess to connect the first exposure recess and the second exposure recess to each other, wherein the first fuse terminal is accommodated in the first exposure recess and placed on and connected to the first input terminal, wherein the second fuse terminal is accommodated in the second exposure recess and placed on and connected to the second input terminal, wherein the fuse line is arranged in the channel and connects the first fuse terminal and the second fuse terminal.

14. The overload protection device of claim 13, wherein the first input terminal comprises a first internally exposed surface exposed upwardly, and the second input terminal has a second internally exposed surface exposed upwardly, wherein the first fuse terminal is placed on the first internally exposed surface and electrically connected to the first input terminal, and the second fuse terminal is placed on the second internally exposed surface and electrically connected to the second input terminal.

15. The overload protection device of claim 1, further comprising a heater holder comprising an accommodation space to accommodate the resistance heating element, wherein the base comprises an installation space formed in the inner space to install the heater holder, and an outer shape of the heater holder corresponds to an outer shape of the installation space such that the heater holder is accommodated in the installation space.

16. The overload protection device of 15, wherein the resistance heating element comprises a heating coil wound to have a predetermined length and curved in an arc shape having a curvature, wherein the movable arm is placed above the heating coil and crossing the heating coil in a diameter direction of the heating coil, wherein the accommodation space has an arc shape to accommodate the heating coil.

17. The overload protection device of claim 16, wherein the heater holder has a tetragonal outer shape, and a first curved surface curved outward is formed on at least a side of the heater holder, wherein the installation space of the base has a tetragonal outer shape, and a second curved surface corresponding to a shape of the first curved surface is formed on an inner circumferential surface of the installation space.

18. The overload protection device of claim 16, wherein the heater holder comprises:

a side wall having a tetragonal outer shape and formed along a peripheral outer side of the accommodation space around the accommodation space: and upper extensions protruding upward from upper portions of four corners of the side wall and arranged around the accommodation space, wherein the bimetal is placed and supported on the side wall.

\* \* \* \* \*

UNITED STATES PATENT AND TRADEMARK OFFICE
CERTIFICATE OF CORRECTION

PATENT NO.         : 10,483,067 B2
APPLICATION NO.    : 15/744606
DATED              : November 19, 2019
INVENTOR(S)        : Yang et al.

It is certified that error appears in the above-identified patent and that said Letters Patent is hereby corrected as shown below:

In the Claims

Column 25, Claim 4, Line 63, "claim 2" should be --claim 1--.

Column 26, Claim 8, Line 39, "claim 2" should be --claim 1--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*